United States Patent

Linn

Patent Number: 5,671,008
Date of Patent: Sep. 23, 1997

[54] TELECINE SYSTEM

[76] Inventor: Stephen Scott Linn, 702 5th St., Hermosa Beach, Calif. 90254

[21] Appl. No.: 393,555

[22] Filed: Feb. 23, 1995

[51] Int. Cl.⁶ .......................... H04N 3/36; H04N 5/253; H04N 9/11; H04N 9/47
[52] U.S. Cl. .................. 348/97; 348/513; 348/105; 348/107; 360/3
[58] Field of Search .................. 348/97, 722, 102, 348/105, 107, 513; 360/14.1, 14.3, 3; H04N 3/36, 5/253, 9/11, 9/47

[56] References Cited

U.S. PATENT DOCUMENTS

| | | | |
|---|---|---|---|
| 3,752,906 | 8/1973 | Lowry | 358/332 |
| 4,506,300 | 3/1985 | Fearnside | 348/110 |
| 4,553,176 | 11/1985 | Mendrala | 358/334 |
| 4,587,572 | 5/1986 | Digiulio | 360/14.3 |
| 4,594,614 | 6/1986 | Frank et al. | 358/214 |
| 4,597,006 | 6/1986 | Orsburn | 348/586 |
| 4,786,979 | 11/1988 | Claus et al. | 358/335 |
| 4,814,885 | 3/1989 | Beard | 358/214 |
| 4,901,161 | 2/1990 | Giovanella | 358/346 |
| 4,914,520 | 4/1990 | Beard | 358/214 |
| 5,119,191 | 6/1992 | Van Den Heuvel | 358/97 |
| 5,249,056 | 9/1993 | Foung et al. | 348/97 |
| 5,255,091 | 10/1993 | Lyon et al. | 358/140 |
| 5,321,500 | 6/1994 | Capitant et al. | 348/97 |
| 5,329,309 | 7/1994 | Dorricott et al. | 348/97 |
| 5,353,119 | 10/1994 | Dorricott et al. | 348/446 |
| 5,419,506 | 5/1995 | Gunday et al. | 242/336 |
| 5,457,491 | 10/1995 | Mowry | 348/104 |
| 5,469,209 | 11/1995 | Gunday et al. | 348/96 |
| 5,475,423 | 12/1995 | Einberger | 348/97 |
| 5,493,330 | 2/1996 | Tomura et al. | 348/102 |
| 5,506,639 | 4/1996 | Frazen et al. | 352/31 |

*Primary Examiner*—Andrew Faile
*Assistant Examiner*—Vincent F. Boccio
*Attorney, Agent, or Firm*—Cislo & Thomas LLP

[57] ABSTRACT

A portable and economical telecine machine for rapidly converting images recorded on motion picture film to electronically available and manipulable video signals with extremely high frame accuracy and temporal correspondence. On a commercially-available flatbed editing table, motion picture film passes through a light-tight enclosure surrounding a strobe, the film, a mirror, and a video camera. When the film is centered between the strobe and the camera, the strobe flashes to optically transmit the film image to the video camera. The film is then advanced exactly one single film frame to record the next image. In this way, film images are recorded frame by frame by a video camera, converting the film images into video signals. Passage of the film is monitored by a film sprocket coupled to a bi-phase encoder. When the image is optically transmitted to the camera, it is recorded in the two next available video fields by the video camera. Four such sequential video fields are followed by a single blank video field in order to create a video signal that temporally or in a time-wise manner corresponds to the original motion picture film. The video signal is transmitted to a signal processing transceiver/control circuit where corresponding time code is associated with the video signal. Initial film frame and time code information are available to the present telecine invention via a laptop computer which also controls the operation of the telecine machine.

20 Claims, 11 Drawing Sheets

TYPICAL 3/2 PULLDOWN TRANSFER

TELECINE SYSTEM

BACKGROUND OF THE INVENTION

1. Field of the Invention

The present invention relates to video editing systems, and more particularly to telecine machines.

The word "telecine" refers to the process by which images on motion picture film are transferred to various videotape formats and/or digital imaging systems.

This invention relates to the high-end telecine systems which accomplish transfer to video with precision frame accuracy and conform to the required technical specifications needed to edit and/or archive these images on various videotape formats and/or digital imaging systems. These technical specifications are common knowledge within the industry.

In order for any type of motion picture image to be shown on television or preserved on any videotape format and/or digital imaging system, it must first go through the telecine process.

2. Description of the Related Art

When motion picture film first came into use in the late 1880's, there was no process by which it was possible to edit, or rearrange the order of, images shot in the camera. Each shot was filmed in the order the director wished to have it appear on screen. Audiences saw positive image prints made from camera originals. The earliest films lasted hardly more than minutes, and recorded sound was still forty years in the future.

In 1902, pioneering director Edwin Porter revolutionized the burgeoning firm industry by making one of the first movies physically assembled from different pieces of film. Now films could be longer. Shots could be rearranged in any desired order, or eliminated entirely. Porter literally invented the editing process.

In order to better explain today's modern editing process, and how the invention is used therein, it is important to understand a few points about how film is manufactured and some basic procedures required in the actual production or shooting phase. These procedures will vary slightly for each production.

Motion picture film is manufactured by coating a clear acetate-type material with a light sensitive emulsion. There are perforated sprocket holes at the edges of the film to allow for sprocket drives to pull the film through the motion picture cameras, editing machines and projectors. This films comes in a variety of format widths. The most common are: 35 mm, 16 mm, Super 8 mm, 65 mm and 70 mm. Most production for TV and theatrical motion pictures use the 35 mm format. Depending on the type of emulsion used, a positive or negative image (in color or black and white) will be produced on the film when it is properly exposed in the camera and subsequently processed at the film laboratory. Most all professional film production uses the negative type film.

Once the original camera negative film is processed, the laboratory will then make a positive print of this film so that it may be viewed and edited. This print is called the workprint. Upon completion of the editing process, the edited workprint is sent to a negative cutter who will take the original camera negative and cut it up to match the edited workprint. Positive prints, called release prints, can then be generated from this cut negative and used for projection and/or transferred to videotape for showing on TV.

In order for the negative to be cut to exactly match up to the edited workprint, the negative cutter relies on a visual reference to KEYKODE numbers which, during the manufacturing process, are photographically imprinted at regular intervals on the edges of the film, outside the picture area. This KEYKODE is a series of ten digits with two letter prefixes. These letter number combinations are essentially non-recurring during the course of a single production and allow for identification of every individual frame of film. Film stock that the film laboratory uses to make the workprint does not contain these KEYKODE numbers, rather they are printed through from the original camera negative along with the main picture image.

The KEYKODE numbers are also printed on the film in bar code and there are specially designed film bar code readers that the editor and negative cutter can also utilize.

For reasons of economic efficiency and schedule considerations, most any type of motion picture film or program is shot out of sequence and in most instances, multiple takes of each shot are required before that particular shot is done to the director's satisfaction. It is therefore necessary to cull out the best of each of the shots and put them in the correct order. An average theatrical feature film will have a running time of about 1½ to 2 hours but it is not unusual for a major production to shoot 25 to 50 hours worth of material.

For purposes of ease of explanation, we describe techniques used in the production and post-production of 35 mm format theatrical feature films which are edited on digital non-linear editing systems. These techniques are generally similar for production in other film formats and could apply to other types of film production such as movies for TV, etc.

At the time of shooting, if sound is required, specially equipped ¼" reel to reel audio decks or DAT cassette recorders are utilized. These recorders have the ability to keep the audio track in sync with the film camera which is running at a constant sound speed of 24 frames per second. This is the "sync sound" camera speed for production in the U.S. In other countries, this speed is usually 25 frames per second. This technology is common knowledge within the industry.

Each time the camera and sound rolls to do a shot, a brief visual and audio slate is recorded at the beginning of the shot. This slate contains identifying information such as the name of the production company, title of the show, scene number, take number, camera roll number, sound roll number and the date. Additional information may also be included. The very top portion of the slate is hinged on one end so that it may open and close. The camera assistant holds the slate in front of the camera, in the open position, and calls out the information for the sound to record. He then quickly slams the slate closed causing a quick audible clap at the point of impact to be recorded on the sound track. There is also a corresponding frame of picture that will show the point at which the slate first hit the closed position and made the clap on the audio track. There is now a common reference point that will later allow the assistant editor to "sync up" the picture workprint and separate audio track. This process will be described in more detail in the editing phase.

Sometimes a slate is used that has an LED or LCD SMPTE time-code display panel built in. SMPTE time code is used in videotape and audio production and post production. It indicates Hours, Minutes, Seconds, and Frames. This allows for immediate identification of any point on the video or audio tape. Time code works on the basis of 30 video frames per second. Its use and the discrepancy between the video frame rate of 30 frames per second versus the film frame rate of 24 frames per second will be discussed in greater detail later.

The sound recorder generates continuous SMPTE time code which is recorded on its own separate audio channel on the sound tape and also transmits the same running time code to the slate. The assistant cameraman does the slating in the same way as described above. The assistant editor can then use the physical clapping of the slate for finding sync or refer to the time code on one frame of picture and match it up to the same time code number recorded on the audio track and displayed visually on a time code reader box. This technology is common knowledge within the industry.

The assistant cameraman and the sound recordist each keep detailed records of the scene numbers and take numbers that are shot and recorded on each roll of film and audio tape. These are known respectively as camera reports and sound reports. A separate report is generated for each roll of film and each roll of audio tape used.

The assistant cameraman and sound recordist will also note on the reports which takes the director liked and wanted to have "printed." These take numbers are circled on the camera and sound reports. These reports are referred to throughout the post-production phase.

Upon completion of each day's shooting, the original camera film is sent to the laboratory for processing and a workprint is made which will then be sent to the editing staff. When the laboratory makes the workprint, they will only print the takes that are circled on the camera report. This is done for reasons of economy and to limit the amount of film the editorial staff must handle.

Similarly, the ¼" or DAT production audio tape is sent to a special sound transfer facility where it is re-recorded, or transferred, onto 35 mm magnetically coated film stock. Only takes that have been circled on the sound report will be transferred. This is done for the same reasons as described above when the film laboratory prints only circle takes.

If time code was on the original tape, it will accordingly be transferred, along with the audio, to a separate track on the 35 mm mag track. If time code was not recorded on the original tape, the transfer house, upon request of the production company, may generate its own time code onto the 35 mm mag tape.

One of the reasons for putting time code on the audio track is to allow the film and sound editors to keep track of every frame of sound, just as KEYKODE on the picture workprint allows the editor and negative cutter to keep track of every frame of picture.

The workprint and 35 mm mag track are sent to the editing room where they will be "synced up" and made ready for editing.

As the camera and sound recorder do not start or stop at exactly the same time, the length of a shot will vary between the workprint and 35 mm mag track. It is the assistant editor's job to resolve this discrepancy by adding fill leader to the shorter of either the picture or sound so that each is exactly the same length. The assistant will then use the slate sync points, described earlier, to sync up the picture and sound for each take or shot. The assistant uses a mechanical synchronizer which keeps the workprint and mag track running in parallel and in perfect sync.

The assistant will string enough of these synced-up shots together in the order of the camera and sound roll numbers to make up rolls that are generally 1,000 feet in length. This is the amount of film that is easily handled at one time and it is the industry standard when referring to a "reel" of film.

One thousand feet of film represents approximately 11 minutes of running time.

These rolls are referred to as "daily rolls" or "dailies" for the obvious reason that this work is done on a daily basis.

In the editing process, a special tape splicer is used to tape all the pieces of film together. A tape very similar to clear Scotch tape is used. Pieces of film may be constantly rearranged simply by peeling off the tape and making the adjustment and retaping or splicing the workprint. The same type of tape is used for the mag sound track, but the tape is white so that it is easier to see.

Once the daily rolls are made up, they are then imprinted with Acmade code. The workprint and mag track are each run through a machine that is like a miniature printing press and which prints an inked letter and number code along the edges of the film, at regular intervals, in between the sprocket holes.

Acmade code is a series of sequential numbers with two letter prefixes. This code appears at regular intervals. The set of numbers that is assigned to a workprint roll is also exactly printed on the corresponding mag track roll.

Acmade code allows the editor to keep track of each piece of film, no matter how big or small, and provides a quick visual link between any frame of picture and its corresponding frame of mag track. When the editor cuts up a scene, he can make sure he is also cutting the exact same corresponding piece of mag track.

After the Acmade code is imprinted, the actual creative editing process can now begin.

While the upright Moviola editing machine was the industry standard from its inception in the early 1900's and its current design version is still in limited use today, the KEM and Steenbeck flatbed editing tables have been the mainstream systems in the United States and Europe for close to 30 years. These editing tables have much larger and better picture heads, higher quality sound reproduction, and are more versatile than the Moviola. Among the two, the KEM is the most widely used in the U.S..

These are literally large mechanical table tops at which the editor sits and across which he runs his picture and sound in sync. The film and sound rolls sit on separate transport plates on the left side of the table and are pulled through a series of sprocket drives and rollers across the picture and sound heads and then taken up on individual transport plates on the right side of the machine. The picture head sits in the middle of the machine and is about the size of a small TV set. The sound head is capable of reading any time code that may be on the center stripe or balance stripe of the mag track.

If a show was being cut entirely on film, the editor might have two of these type machines. One would be used to run through the dailies roll to select the desired shots and corresponding sound. The editor would then physically cut out those pieces he wanted and add them to his edited picture that he was building on his second machine. The KEM Universal 8-plate machine allows for use of multiple picture and sound heads so that the functions of sorting through dailies and editing can be performed on one machine.

With this editing method, every time a scene, shot or film sequence needs revision, the film has to be physically peeled apart to separate the taped-together segments. The edited film is then reconnected in the preferred sequence. If the editor wants to make a shot a little bit longer, he would have to go back to his correct dailies roll, put it up on the machine, run down to where the remaining portion of his desired shot is, cut as much of the portion out as he thinks he needs and add it to the shot he wanted to lengthen on his edited film roll. This process if very laborious and time consuming.

In the late 1980's, it became possible to load motion picture file images and audio tracks into specially designed editing computers with vast reservoirs of memory (hard disk and RAM), as well as sufficient graphics capability. All picture and audio is stored as digital information in huge arrays of hard drives, along with SMPTE time code, NAGRA audio time code, and Acmade code. KEYKODE information can also be stored. The editor has instant access to any frame of picture or sound. Scenes can be cut, changed and rearranged instantly without the editor even having to physically touch a piece of film or sound track. This is known as non-linear editing and is considered one of the most effective means by which film can be edited.

The two most widely used systems for feature film and TV non-linear editing are the LIGHTWORKS and AVID systems. These systems and all the needed accessories rent from $8,000 to $10,000 per month, a considerable expense compared to several film editing tables that might rent for a total of $4,000 per month.

In order to load the motion picture film and sound into the computer, the 1,000' dailies rolls that the assistant editor has made up must be transferred with frame accuracy and temporal or time-wise correspondence to a videotape format such as ¾", S-VHS or Beta. This is known as the "telecine" process.

In the simplest of terms, the film images are projected into a video scanner or camera and the audio is played back on a conventional 35 mm magnetic recorder in sync with the film. Both are recorded onto the videotape. If there is time code on the audio track that is also recorded, a separate video time code is generated and also recorded on the tape. This video time code is used for referencing by the editing systems. The telecine operator creates a database log that includes the dailies roll number, scene number, take number, Acmade code, NAGRA audio time code, etc.

The motion picture film runs at a speed of 24 frames per second, while the normal video frame rate is 30 frames per second with each video frame having two video fields for 60 fields per second. This discrepancy of frame rates requires an extremely complicated technical process in order to produce a videotape transfer suitable for 24 frame per second, frame-accurate editing in a non-linear editing system. The exact technology is common knowledge within the industry and will be described in abbreviated detail below. Basically, one second (twenty-four frames) of motion picture film physically translates as ²⁴/₃₀ths or ⅚ths (0.83) of a second of video signal time. Over the course of a feature length motion picture (on the order of ninety minutes or more), this discrepancy corresponds to eighteen minutes of time which is wholly unacceptable as the mis-synchronization of only a single film frame (one twenty-fourth of a second) can be noticed.

The telecine systems that can handle this technical discrepancy are extremely sophisticated, delicate, and very expensive to buy and maintain. They require highly trained personnel to operate and maintain them. They are large and not readily portable, except when installed in large mobile video vans. Most such systems are permanently installed in large high-end video post production facilities, or at the major TV networks. These type telecine facilities, including accompanying support equipment, can cost from $500,000 to $1,000,000 to install.

The Rank Cintel Flying Spot Scanner and the Bosch Telecine are two of the most commonly known telecine systems for high-end professional video production.

For example, a prior art device, the Rank Cintel, scans each frame of film on a line by line basis while the Bosch captures the film frame image with a video camera. In both instances the resulting video image is recorded on tape, duplicating fields as necessary to achieve the typical 3/2 pulldown configuration (FIG. 7). Reference information such as SMPTE time code, Acmade numbers, and KEYKODE are overlaid onto the video signal as well as downloaded into a database file in a format recognizable by digital non-linear editing systems. This reference information is controlled by the telecine operator using accessory equipment. The telecine operator can also include additional information in the database such as camera and daily roll numbers, and scene and take numbers.

It is believed that because the digital editing system discards certain video frames during the digitation process, the system must know the starting "A" frame of the 3/2 pulldown sequence, or else the system will discard some essential frames and digitize some duplicate frames. Digital editing machines use the time code reference numbers to recognize starting "A" frames. Generally, when the time code (hours, minutes, seconds, frames) indicates a frame count of :00 or :multiple of five (:05, :10, :15, etc.), the digital editing system initializes the 3/2 pulldown start "A" frame sequence. The proper "saving" or "discarding" of frames will be correct when the time code for the "A" frame is known.

During the telecine process, a sophisticated and expensive edit controller is required in order to allow the "A" frames to always occur on the time code at frames :00 and :05 or any multiple of :05. Without this controller the "A" frames could occur, for instance on the :02 & :07 frames, etc.

Alignment of the start A frame to the :00 frame (or multiple of five) time code reference is dependent upon the accuracy of the telecine operator using this accessory equipment. Errors in the alignment of the reference information to the 3/2 pulldown occur occasionally. The film editor must then have the film re-telecined, resulting in production lags.

Typically, for use with digital non-linear editing systems, a film editor will have the film transferred to NTSC video using equipment designed for television broadcast. The process is time consuming as the sync dailies rolls must be sent from the cutting room to a professional high-end videotape facility. This usually results in a day's delay before the film transfer can be loaded into the editing system and be available for the editor to begin working with.

The 24 frame per second film is transferred to videotape running at 30 frames per second. Each video frame has two video fields which are interlaced to constitute each video frame. In order to correct for the discrepancy between the film frame rate and the video frame rate, a process known as 3/2 pulldown is used which prevents the video signal from temporally compressing the film. As the videotape could record 30 film frames per second, one second of video would correspond to one second plus another quarter of a second of film time. Thirty minutes of film would then be recorded in twenty-four minutes of video.

Because of storage constraints in digital non-linear editing systems, usually only one video field representing a corresponding film frame is stored. Digital editing machines must consistently select the odd or even video fields for storage. They duplicate images on playback back to the typical 3/2 pulldown (see FIG. 7).

Telecine costs for transferring film to tape, for non-linear editing system usage at today's telecine facilities runs from $250 to $325 per hour of facility time. For every hour of film "dailies" to be transferred, three to four hours are required to accomplish the transfer. This is because the telecine operator has a great deal of information he must load into his computer that will either be put onto the videotape or become a data file on a floppy disk that must also be loaded into the film editing computer along with the video transfer.

A typical major motion picture will shoot anywhere from 45 to 60 days and may have an average of 60 minutes of film to transfer every day they are shooting. This can mean weekly telecine bills of $5,000 or more, with a show total bill of up to $60,000. As the digital editing process proceeds, edit lists are generated and printed out that tell the assistant editor exactly how to match up the film workprint and sound track to the edited version on the flatbed. This cut workprint and sound track is then used for projected screenings for the director and producers and for previews.

From the foregoing, it can be seen that a low-cost telecine machine that could create video signals ready for the digital editing machine would provide a significant leap in film editing technology. Such a machine should also create and maintain a temporal correspondence between the generated video signal and the original motion picture film. Furthermore, there should be a direct and one-to-one correspondence between the media codes associated with the video signal used by the digital editing machine to non-linearly edit the film and the media codes used to indicated the individual frames of the film. However, no such machine currently exists. If such a machine could be coupled to a flatbed editing table, the telecine could be provided in the editing room or at remote locations, resulting in both time and costs saving convenience.

SUMMARY OF THE INVENTION

The present invention provides a low cost, simple to operate, telecine system that works on KEM or other flatbed editing tables in the editing room. The system may be portable and can be operated by an editing assistant, freeing up the editor for more useful and/or demanding tasks. Telecine transfers are possible in the editing room "on demand", 24 hours a day, seven days a week. In addition to dramatic cost savings, there are no editing delays due to having to schedule and send the film out to a separate telecine facility. The production company never has to have their film in outside hands, a constant concern as it relates to program piracy.

The system consist of three major components:
1. The telecine module that fits on a flatbed editing table in place of the usual film picture module;
2. The control circuit which keeps track of and synchronizes the film transport mechanism of the flatbed editing table with the video image camera/recorder; and
3. The laptop database computer which acts as a user interface, gathering editing data from the telecine operator and the control circuit and transmitting instructions from the operator. The computer greatly reduces the inherent complexity of the telecine process implemented by the present invention, especially in light of prior art devices, as internal programming anticipates, as much as possible, the operation of the present telecine system.

The present telecine system produces high resolution, stable video images that do not weave or bob and can easily be made flicker-free. Importantly, the present telecine system produces a video signal that temporally corresponds in a very consistent and close manner with the film upon which the video signal is based. This temporal correspondence, along with associated media codes and a telecine log file, allow the telecine system of the present invention to meet all the technical requirements for producing a videotape suitable for transfer into well known, prior art digital editing machines, such as LIGHTWORKS and AVID digital non-linear editing systems.

In one embodiment of the herein disclosed system, the video signals are recorded onto videotape and the telecine log file is written to floppy disk. The two are then linked to a digital editing machine for download to the digital editing machine. The transfer may also be made directly into digital editing systems without first going to videotape. However, this direct process is currently still being developed in the art as the telecine log file is currently required by the digital editing machine before the transfer takes place from the videotape to the digital editing machine. Such limitations may change in the near future and the present invention could be adapted accordingly.

The present telecine transfer system provides for frame accurate and properly encoded video signals for digital editing by a digital editing machine in an easy to use and simple manner at previously unavailable and affordable costs. Furthermore, the telecine process implemented by the present invention takes only a little more time than it takes to run the film, rather than the two or three times the time that systems like those of the prior art Rank and Bosch necessitate.

It should be noted that both the KEM and Steenbeck have film-to-tape transfer modules for their flatbed editing tables. However, these modules do not produce high resolution images. They do not provide steady flicker-free pictures and they cannot produce a videotape cassette suitable for frame-accurate digitizing into digital editing machines. When such earlier prior art flatbed transfer systems are used, the picture weaves, bobs, and jiggles, and the picture quality is poor.

Telecine transfer by the previously-known Rank and Bosch systems are expensive, time-consuming, and laborious. Although such disadvantages present in Rank and Bosch systems could inhibit their use, they represent the current state of the art in telecine transfer. In comparison with these cumbersome and difficult systems, the present invention stands out in dramatic contrast. With the present system, telecine becomes more available, much more affordable, and much less burdensome. The present invention opens wide the door to digital editing techniques for a much greater number of film makers.

To accomplish the task of transferring film to video for frame accurate editing, the invention operates as follows. The system has an input from the video camera to phase lock the motion picture film movement to the video signal. A video sync stripper is used to determine the video camera timing. The system controls the film movement to maintain a phase lock with the video camera sync signal.

The system determines when the center of the film frame passes so that a strobe light can be triggered to project a film frame image to the video camera. The projected image is stored in the video camera. Synchronization via quadrature is provided by a bi-phase encoder linked to a film sprocket. This can also be done optically by sensing and counting the film's perforations as they pass, or by a film movement transport which follows the phase lock pulses accurately enough by counting the pulses sent so that the strobe light trigger is activated in the center of the film frame.

The system transmits as output specifically formatted video signal output to either a video cassette recorder (VCR) or a digital editing machine. The formatted video signal output includes conventional video frame code (SMPTE) so that the digital editing machine can uniquely identify each video frame and determine which frames are discardable duplicates or blanks and record only the needed frames.

The system also generates, maintains and records the reel identification and the current footage and frame codes (Acmade codes) of the film so that when the digital editing is performed, it is possible to determine the exact location of the source film material for physical editing. The invention generates, maintains and records SMPTE time code for this purpose as well.

Beyond attaching and associating SMPTE time code with the video signal, the system sends out the current SMPTE time code and current position (feet and frames, Acmade code) (35 mm motion picture film has 16 frames per foot) and a reel ID in a binary RS-232 format or the like to a standard PC with special software. The operator stores this information in a computer file (the telecine log file) so that the digital editing machine can import this information and use it in creating an Edit Decision List used to indicate final cut sequences. The SMPTE time code and the reel ID and the footage and frames can also be visually inserted by character overlay into the video signal (and subsequently digitized) as visually perceptible means of keeping track of the location of the source film material. Other media codes, such as NAGRA audio time code and KEYKODE can be accommodated by the present invention.

The present invention has a video camera that stores an instant of light comprising an image and then sends that image out on the next two consecutive video fields. The system transmits the video signal and associated SMPTE time code to a video cassette recorder (VCR) for later transfer to the digital editing machine. Alternatively, the video signal and SMPTE time can be recorded directly into the digital editing machine.

For every two film frames, five video fields are created in the video signal stream by reception of the images held on the two film frames by the video camera. The first two video fields compose a video frame corresponding to the first film frame. The next two video fields compose a second, following video frame corresponding to the second film frame. The last video field is null or blank and serves to maintain temporal or time-wise correspondence between the thirty frame per second video signal rate and the twenty-four frame per second motion picture film speed.

The null or blank video is also harmoniously consonant with industry-established 3/2 pulldown recognized by digital editing machines. It can also serve to indicate when the video signal has been improperly transferred to the digital editing machine as the blank fields will erroneously appear in the digitized signal. This process is repeated for the next two film frames, with every four film frames corresponding to ten video fields.

If the operator wishes to view the film to video transfer without the black fields (producing the flicker in the picture), a video field storage device can store and retrieve the previous video field until the new image is ready. If the system is used in PAL format instead of NTSC, the flicker is eliminated if the motion picture film is run at 25 frames per second because PAL cameras operate at 50 fields per second, and each strobe pulse will illuminate 2 video fields.

It is an object of this invention is to provide a simplified film to video transfer system using a continuous movement film transport.

It is an object of the present invention to provide a telecine video signal that temporally corresponds to an original motion picture film with the motion picture film frames uniquely corresponding to individual video signal video frames, with the resulting telecine video signal being ready for digital editing machine use.

It is an object of the present invention to provide a frame accurate telecine system that is portable, relatively inexpensive and requiring relatively little processing time compared to extant devices.

It is an object of the present invention to provide a telecine system that resolves the frame discrepancy between motion picture film and video signals.

It is also an object of the present invention to provide a preliminary telecine log file edit list for a digital editing machine.

These and other objects and advantages of the present invention will be apparent from a review of the following specification and accompanying drawings.

DESCRIPTION OF THE PREFERRED EMBODIMENT(S)

The present invention resides in a low-cost, easy to use, telecine system 10 that quickly converts motion picture film images to video signals with extremely high frame accuracy and temporal correspondence while also producing a telecine log list for initializing a digital editing machine. One image of motion picture film captured in one film frame has a one-to-one correspondence or correlation with the resulting video frame and the video signal generated from the motion picture film corresponds temporally with the motion picture film. The telecine process achieved by the present invention is also relatively fast, especially in comparison with industry-standard telecine machines.

Such video transfer frame accuracy has not been achieved in the field of motion picture editing before in, a portable and economical fashion. Without such frame accuracy, digital editing of the resultant video images is made much more difficult or impossible. Furthermore, without such frame accuracy, conforming the actual film workprint or camera original negative to the edited digital video will become extremely difficult and improper editing cuts will be made.

Inconvenient and extraordinary means will have to be taken in order to make the correct conformation.

As set forth above, attempts have been made in the past to provide telecine conversion of motion picture film to video image signals. However, none of these prior attempts accomplished the frame accurate telecine conversion as effected by the present invention.

In order to sequentially present the motion picture film frames for video conversion, a flatbed editing table 12 is preferably used. Such flatbed editing tables are manufactured and marketed by KEM and Steenbeck, but other flatbed editing machines or the like are available and adaptable and work equally as well.

Figure 1:
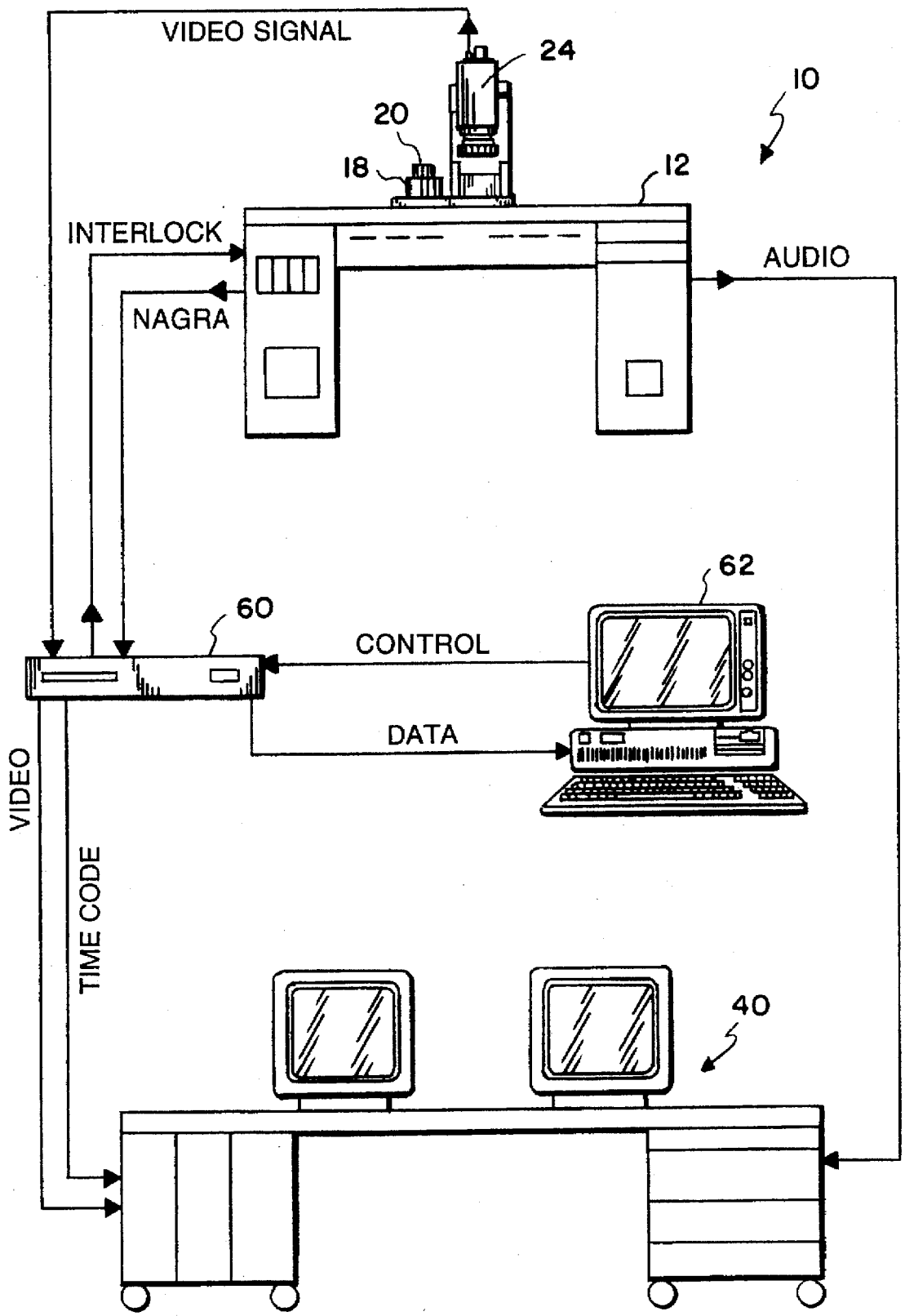
FIG. 1 is a schematic drawing of the present invention showing the signal links between the various system elements.
Figure 2:
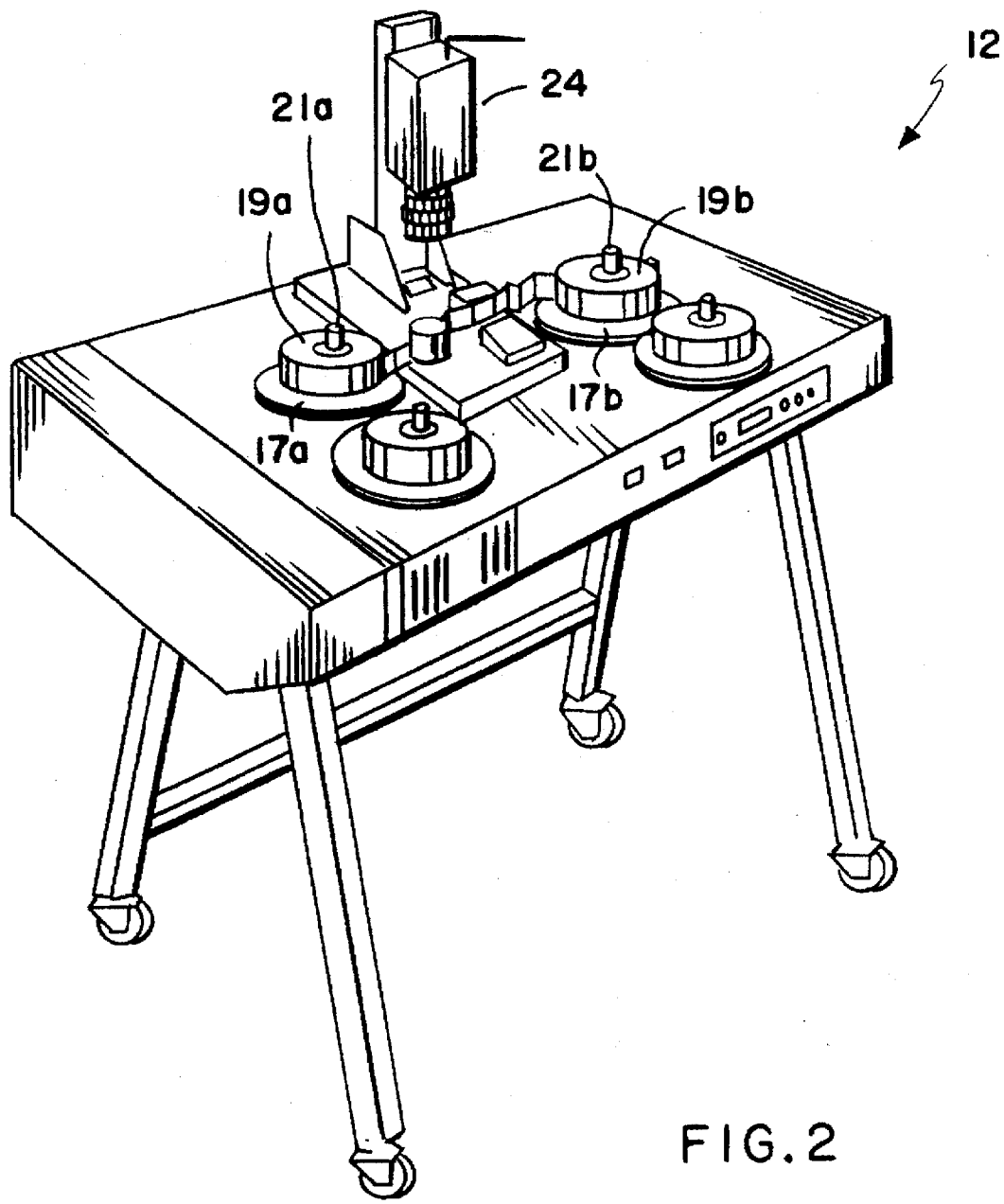
FIG. 2 is a top perspective view of a flatbed editing table adapted for use in the system of the present invention as it includes a video camera head and strobe.
Figure 3:
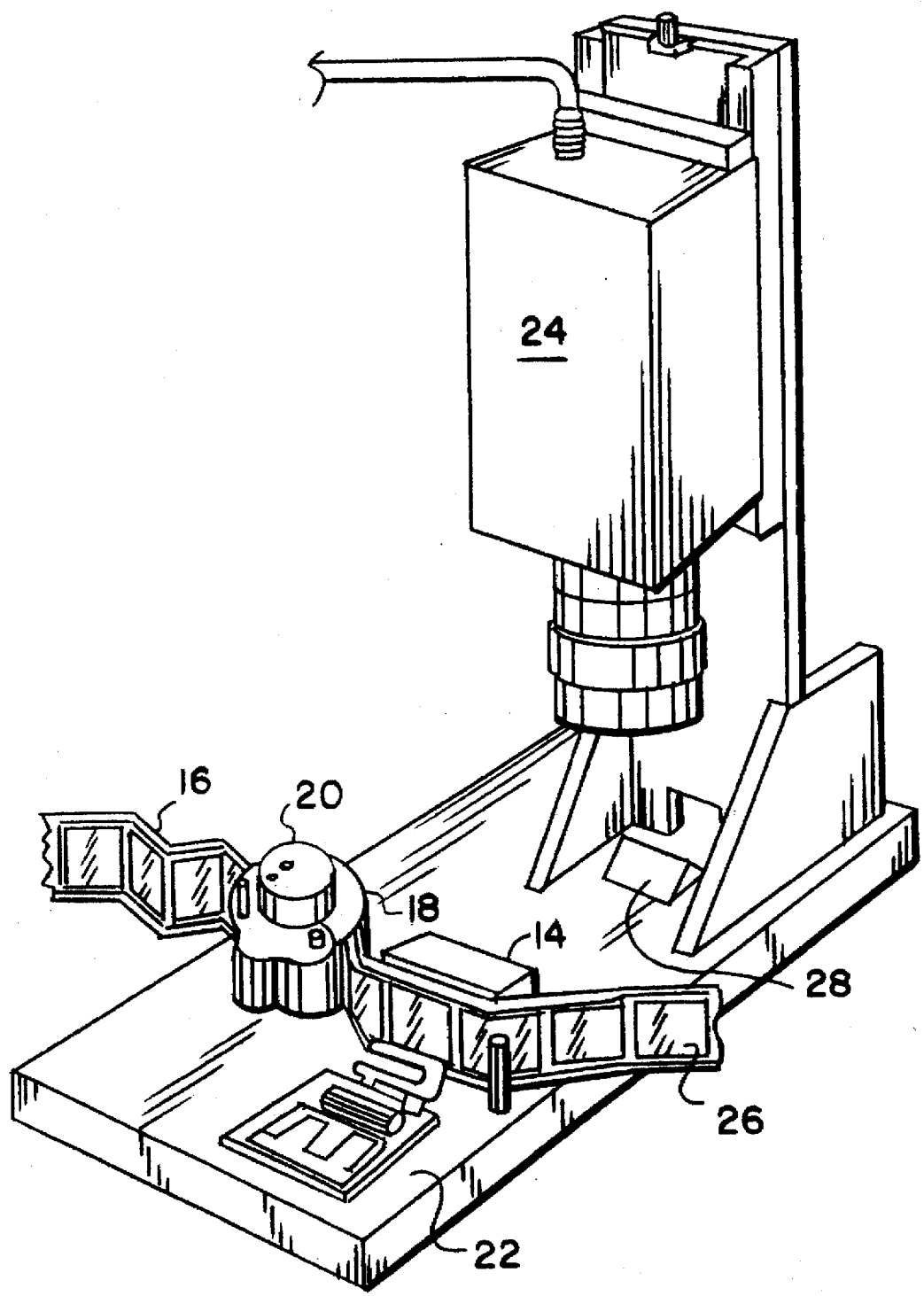
FIG. 3 is an enlarged perspective view of the telecine adapter used in conjunction with the flatbed editing table shown in FIG. 2.

Generally referring to FIGS. 1, 2 and 3, the flatbed editing machine 12 runs the film 16 through a film gate 14 where its image is projected as by a bulb onto a screen. The flatbed machine 12 generally has at least one pair of plates 17a,b that support reels 19a,b of film upon spindles 21a,b. The plates 17a,b are moved by a motor (not shown) and may be run forward or backward. Film transport takes place from one reel 19a to the other 19b across the film gate 14. With more sophisticated flatbed editing machines, more pairs of reels and audio-support equipment are included. The present invention can be used on any of such flatbed editing machines so long as they can be adapted to support a video camera as set forth in greater detail below. The flatbed editing table 12 is remotely controllable as is common for such tables.

In order to hold the film in place as it travels from one plate or reel to its companion, a film gate 14 is used. The film gate holds the film 16 steady and keeps it generally in one location as it unwinds from the supply reel and is wound upon the take-up reel.

Referring to FIG. 3, in order to determine relative film position, the teeth of a high-precision film sprocket 18 with a bi-phase encoder 20 engage the perforations on either side of the film 16. As the film 16 travels past the sprocket 18, the sprocket 18 turns to drive the bi-phase encoder 20. As the bi-phase encoder 20 turns, it emits quadrature cycles that precisely indicate the travel of the film 16. One revolution of the bi-phase encoder 20 serves to emit four thousand pulses (one thousand quadrature cycles). In order to ensure accurate measurement of film motion, the spindle upon which the sprocket 18 turns is machined to within two-thousandths of an inch (0.002").

One frame of 35 mm motion picture film serves to elicit five hundred pulses (one hundred twenty-five quadrature cycles) from the bi-phase encoder 20. 16 mm, 65 mm, 70 mm and other sizes of film can also be accommodated by the present invention as those of ordinary skill in the art will recognize. Each pulse indicates with great accuracy the passing of a short, but definite, length of film past the sprocket 18. By counting the number of pulses transmitted by the bi-phase encoder 20, the length of film 16 travelling past the sprocket 18 can be determined.

The need for accuracy in determining the film position partially arises from the use of a strobe light 22 or other intermittent light source to optically transmit the image captured by a frame of film 26 to the video camera 24. In other flatbed telecine systems, the film may be continuously lit from a light source, such as a 100 watt halogen-type bulb. Such light sources, as well as often-associated multi-faceted rotating prisms used in prior flatbed video transfer systems, cause smearing, blurring, blending or dissolving of the resultant video image when the film frame image is optically transmitted to the video camera.

Within a light-tight chamber (not shown), the strobe light 22 flashes to optically transmit the film frame image to the video camera 24. Preferably, the strobe 22 flashes when the film frame 26 is positioned and exactly centered between the strobe 22 and the camera 24. In order to determine when the film frames are so positioned, the number of pulses from the bi-phase encoder 20 are detected and counted as the film 16 travels past the film gate 14. The strobe 22 is remotely activated so that automatic operation can occur after the bi-phase encoder 20 emits the appropriate number of pulses.

By using a strobe 22 that flashes only when one film frame 26 is before it, only one image is optically transmitted to the video camera 24 at any one time. No blending or dissolving in the resultant video signal occurs between the images that are present between two adjacent film frames. Furthermore, because the strobe 22 flashes so quickly, the video camera 24 perceives no movement of the film 16. It is as if the film frame 26 were standing still so that its picture can be accurately taken by the video camera 24. As set forth in more detail below, due to phase-lock looping, all film frames 26 are positioned in the same place before the strobe 22 so that it is always the same portion of the video camera receiver that is lit up by the frames' images.

The image generated by the strobe 22 flashing through the film frame 16 is transmitted to a high-quality, optically pure mirror or prism 28 which inverts the image before sending it on to the video camera 24. The mirror 28 is held firmly in place and does not spin or otherwise move as with prism-based telecine machines. As the mirror 28 is stationary during the time the strobed image is sent from the film frame 26 to the camera 24, the mirror 28 does not distort or alter the strobed image.

The video camera 24 is mounted vertically perpendicular to the flatbed editing table 12 to receive the strobed image. By mounting the video camera 24 vertically and by using the mirror 28 to invert the strobed image, the image optically transmitted to the video camera 24 is "right side up".

Preferably, the video camera 24 is a charge-coupled device (CCD) camera which is responsive to the optical transmission of light images upon it in a manner such that each strobed image is discretely "captured" in a single video frame (FIG. 6) for purposes of video signal manipulation. Alternatively, other similar video cameras may be used to good effect.

Figure 6:
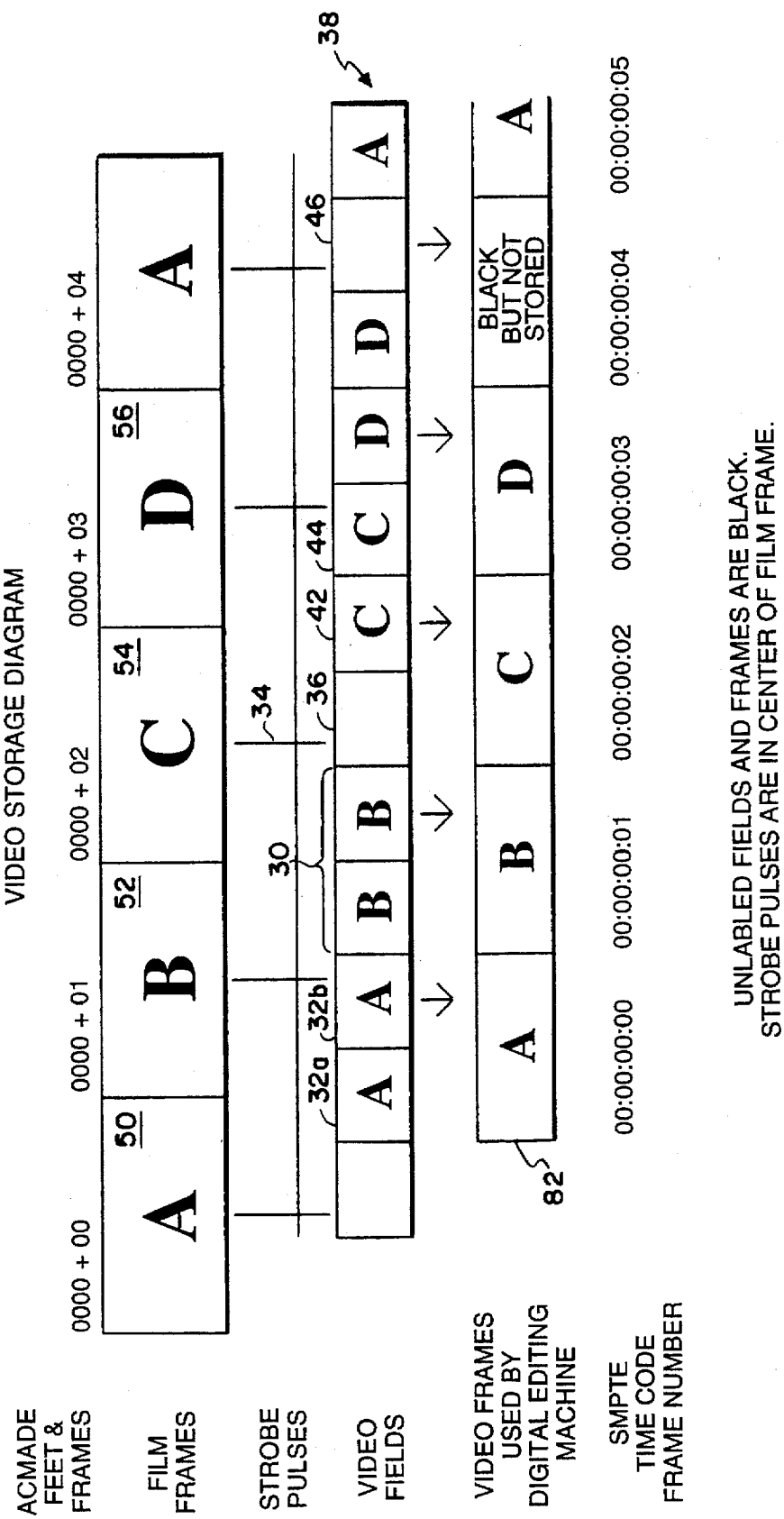
FIG. 6 is a schematic diagram of the video pulldown process used in creating the video signal in the present invention. Of note is the delay in communicating the present image to the video signal until the current video field has been completed.
Figure 7:
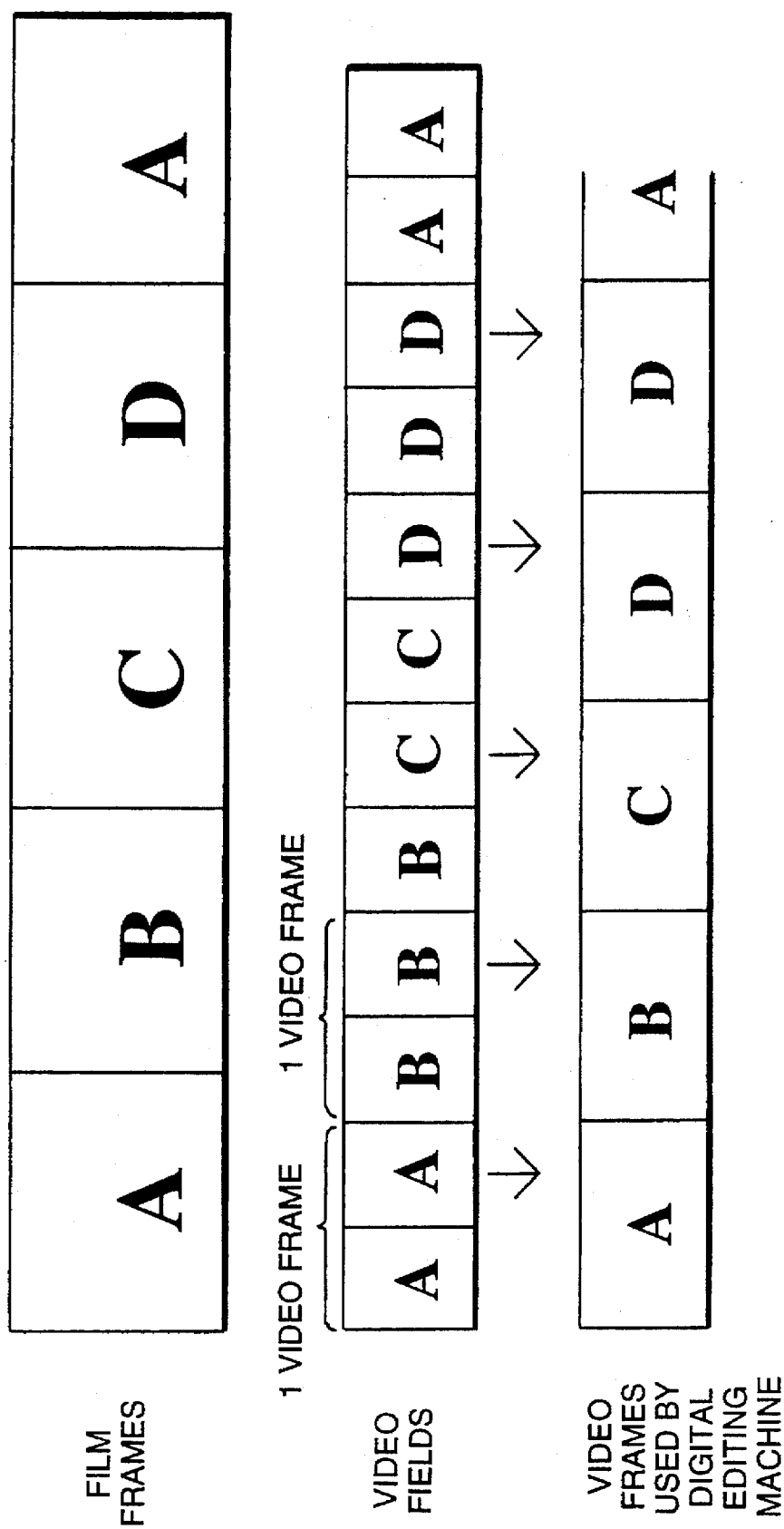
FIG. 7 is a representational diagram of video pulldown already known and commonly used in the art.
Figure 8A:
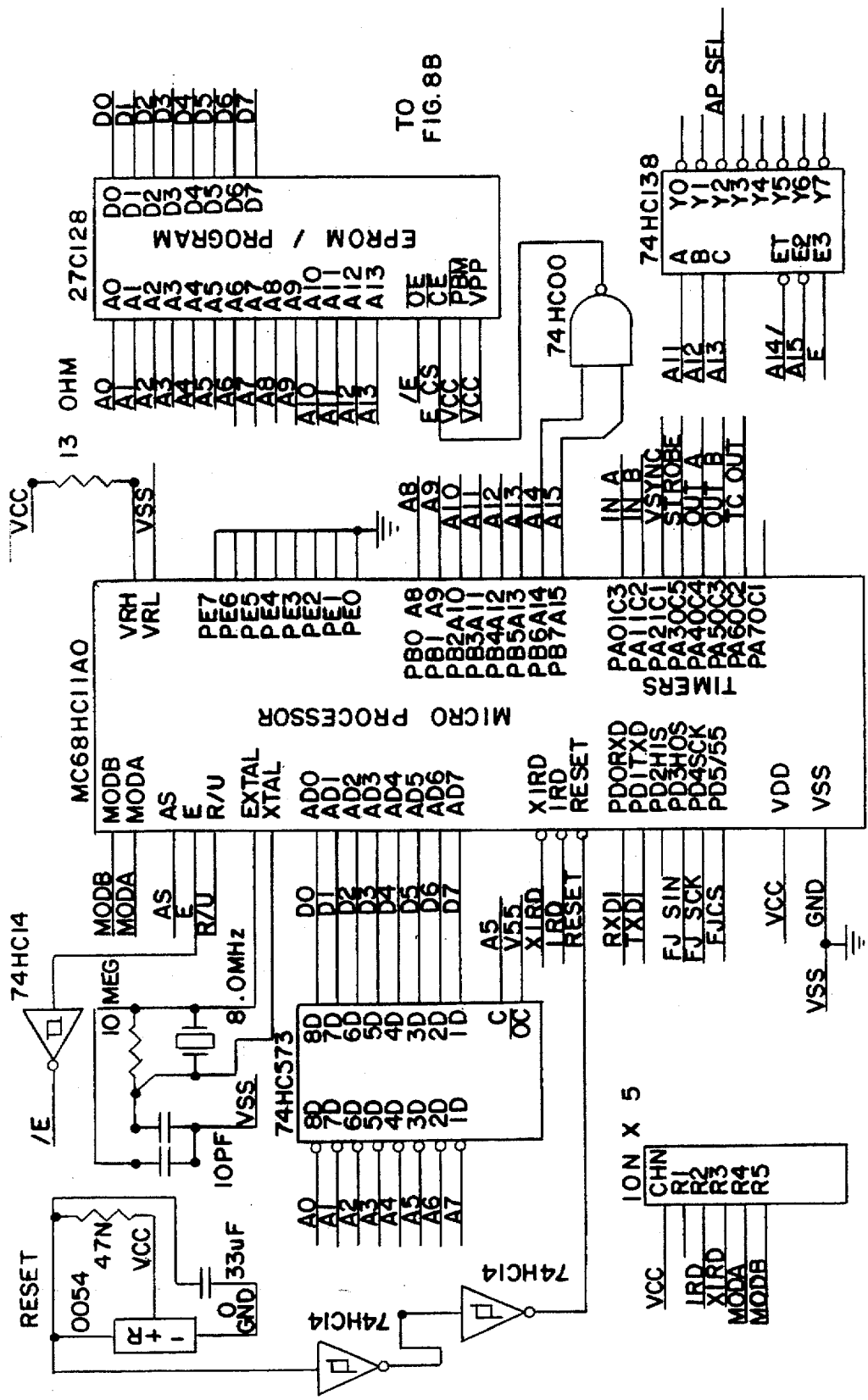
FIG. 8 is a circuit schematic of the signal processing transceiver/control circuit as shown in FIG. 5, including some optional circuit features.
Figure 8B:
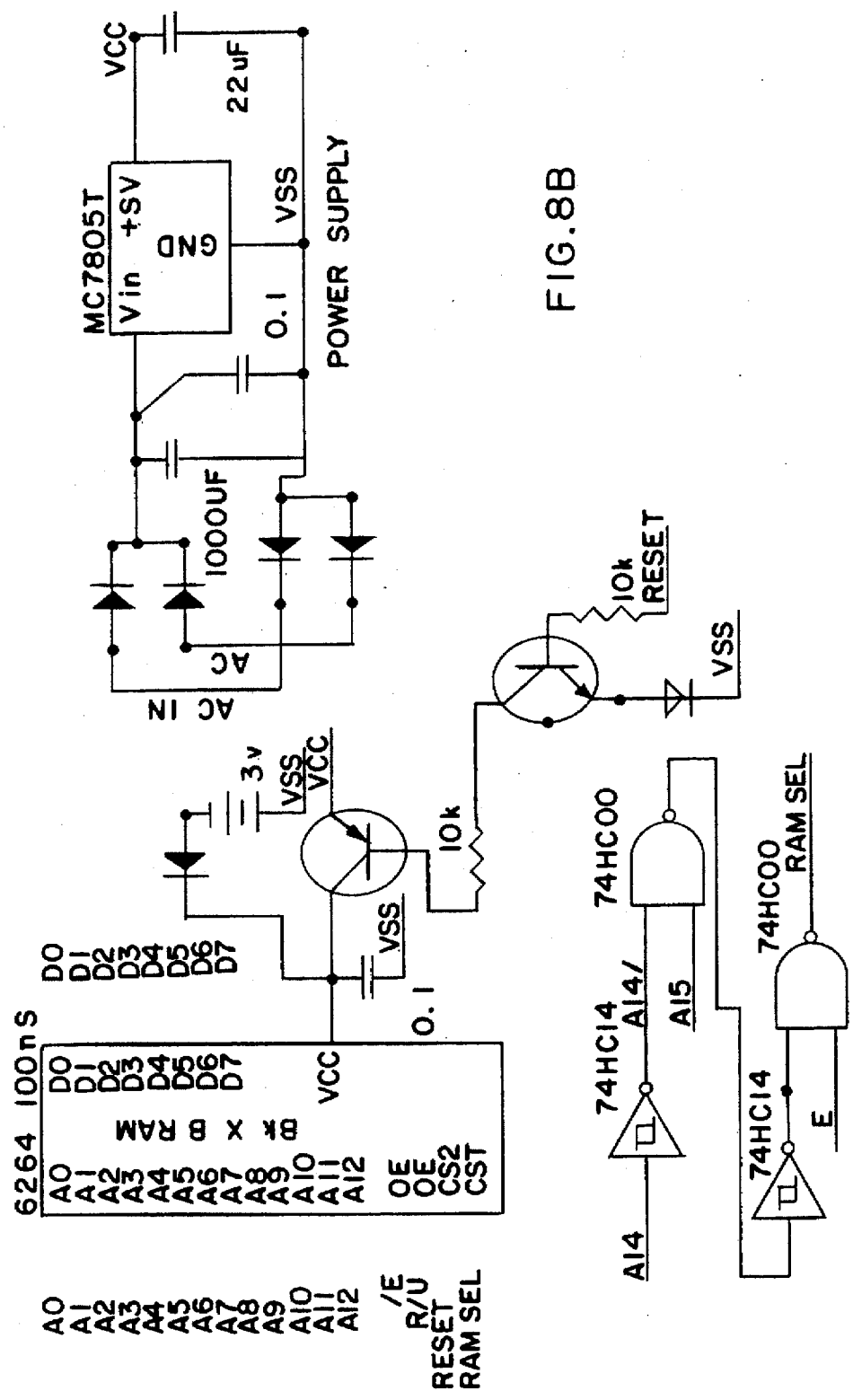
Figure 8C:
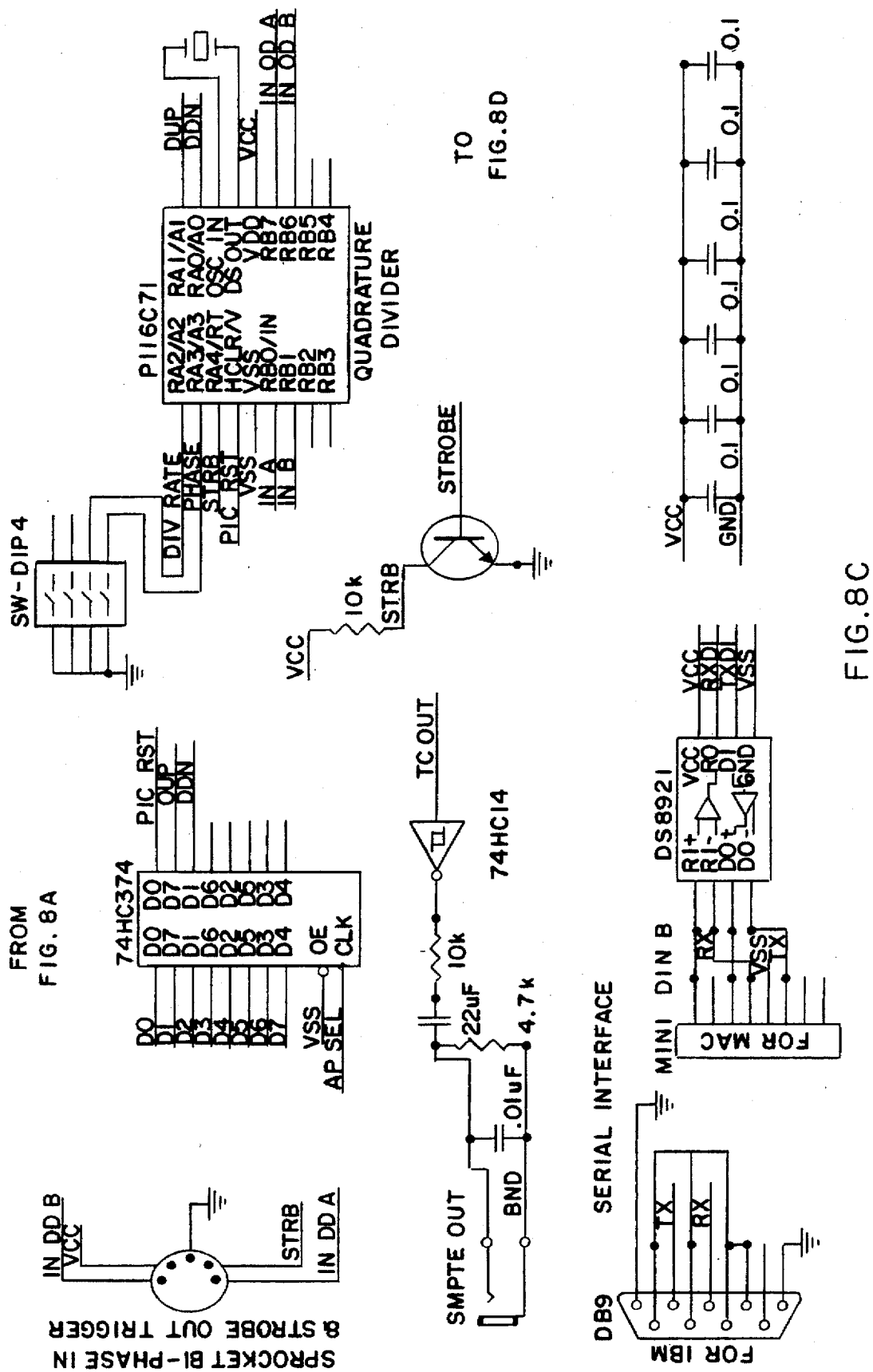
Figure 8D:
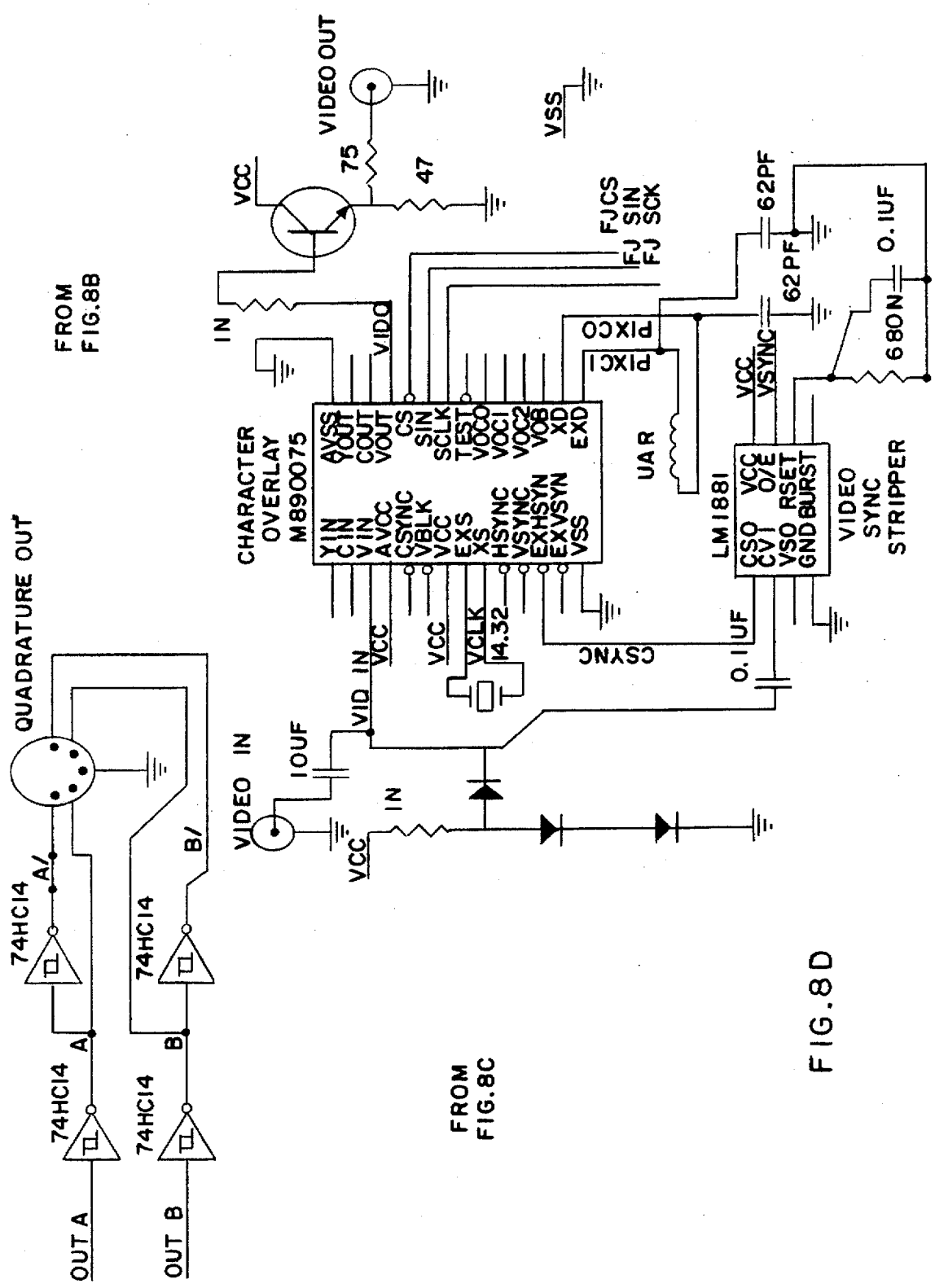

As images are continuously transmitted by the video camera 24 and in order to conform with video standards previously established in the field, video cameras generally segment their video images into video frames 30 (FIGS. 6, 7). According to industry standards, there are thirty (30) such video frames present in each second of video signal transmission.

As television and other video monitors often use a raster-type of video display, each of the thirty (30) video frames is divided into two individual video fields 32a, 32b (FIG. 6). Each of these video fields is one half of the total video image and are interlaced during transmission so as to produce the video frame 30. Basically, all the even lines of the video frame are stored in one video field 32a, while all the odd lines are kept in the other video field 32b.

Because of the close relationship and marked similarity between each of the video fields, it is possible to approximately reconstitute the original video frame image by relying upon only a single video field. Digital editing machines such as those marketed under the names of LIGHTWORKS and AVID take advantage of this feature to generally use only one video field to represent a video frame. In so doing, such digital editing machines realize an approximately 50% reduction in the size of the digitized video signal file.

In the present invention, as each film frame 26 corresponds to a single video frame 30, no loss in correspondence arises when the digital editing machine discards one video field of a pair in a video frame. Furthermore, by eliminating the video field having all the even lines, then duplicating all of the odd lines in the remaining video field in substitution for those lost from the other video field, a resulting video frame very much like the original can be reconstituted from the single, odd-line video field. Reconstitution can also take place using the even-line video field.

When an image is optically transmitted to a video camera, such as a CCD video camera as is preferably used in the present invention, the incoming image is stored into video fields as explained above. These two video fields are complete video fields and should the video camera currently be in the midst of a prior video field, temporary storage of the incoming image will be delayed until a new video field is available for the incoming image 34. This method prevents corruption of the current video field by subsequent camera video signal output.

In order to maintain temporal correspondence between the motion picture film and the generated video signal, blank, null or black video fields 36, 46 are generated and are an important part of the resulting video signal 38.

The blank video fields 36, 46 are included for transmission to (but later discard by) the digital editing machine 40. If the digital editing machine 40 does not discard the blank fields 36, 46, an improper transfer to the digital editing machine has been made and the transfer to the digital editing machine needs to be performed again, perhaps with a different pulldown pattern. Earlier telecine machines did not have such an indicator for improper pulldown.

When a strobed image is optically transmitted to the video camera, the next two available video fields are filled with that strobed image. The next strobed image is then transferred to the next two available video fields. The next available video field is kept black with no image or video image stored therein.

This occurs during the telecine process when the process as set forth herein is conducted at "sound speed". The flash of the triggered strobe light 22 that occurs after the second strobed image has been converted to a video signal image is in within the middle of the ensuing fifth video field 36. As discrete video fields are continuously generated by the video camera 24, the next and third strobed image is received by the video camera 24 after the start of a fifth video field 36. In order to commit the film image captured by the video camera 24 to a video signal 38, transmission of the third image must wait until the next video field 42 is available. This consequently leads to a "skipping" of the fifth video field 36, which is left blank. The third film image captured by the video camera 24 is then committed to a video signal frame in the sixth 42 and seventh 44 video fields.

For every two film frames, five video fields are generated. As preferably contemplated, the first four video fields contain the video frames from the first two film frames (film frames A and B of FIG. 6) while the fifth field 36 is blank. This process is repeated for the next two film frames (film frames C and D) with the tenth video field 46 being left blank. Due to the timing between the twenty-four frame per second motion picture film playback and the thirty frame per second video playback formats, telecine conversion of four film frames (50, 52, 54, 56) serves to establish a repeatable format. Four film frames are converted by telecine to ten video fields having four complete video frames and two blank fields. The process is then repeated ad infinitum for as many following film frames as may be present in the entire length of film.

With the generation of the blank or black video fields, temporal or time-wise correspondence or correlation is made between the motion picture film frames 26 and the video signals 38 generated by those motion picture film frames. Furthermore, discrete and manipulable portions of the video signal 38 are associated in close and discrete correspondence with each individual motion picture film frame 26, a feature not previously present in telecine systems on flatbed tables. The digital editing machine 40 (to which the video signal 38 is ultimately transmitted) easily handles the presence of these dark video fields 36, 46 as they are consonant with the established 3/2 pulldown scheme now in industry-wide use for telecine (FIG. 7). The current method by which such digital editing machines handle current "3/2" incoming video signal regimes is adapted to handle the "2-2-1" pulldown scheme of the present invention.

In order to process the incoming video signal 38, a signal processing transceiver or control circuit 60 is provided so that the appropriately configured video signal 38 may be prepared for storage and/or editing. The control circuit 60 operates like a special purpose computer that translates/transforms the prepared video signal 38 for digital editing, as well as coordinating the activities of the flatbed editing machine 12, the video camera 24, the video storage/editing device 40, and the user interface/control 62.

Figure 5:
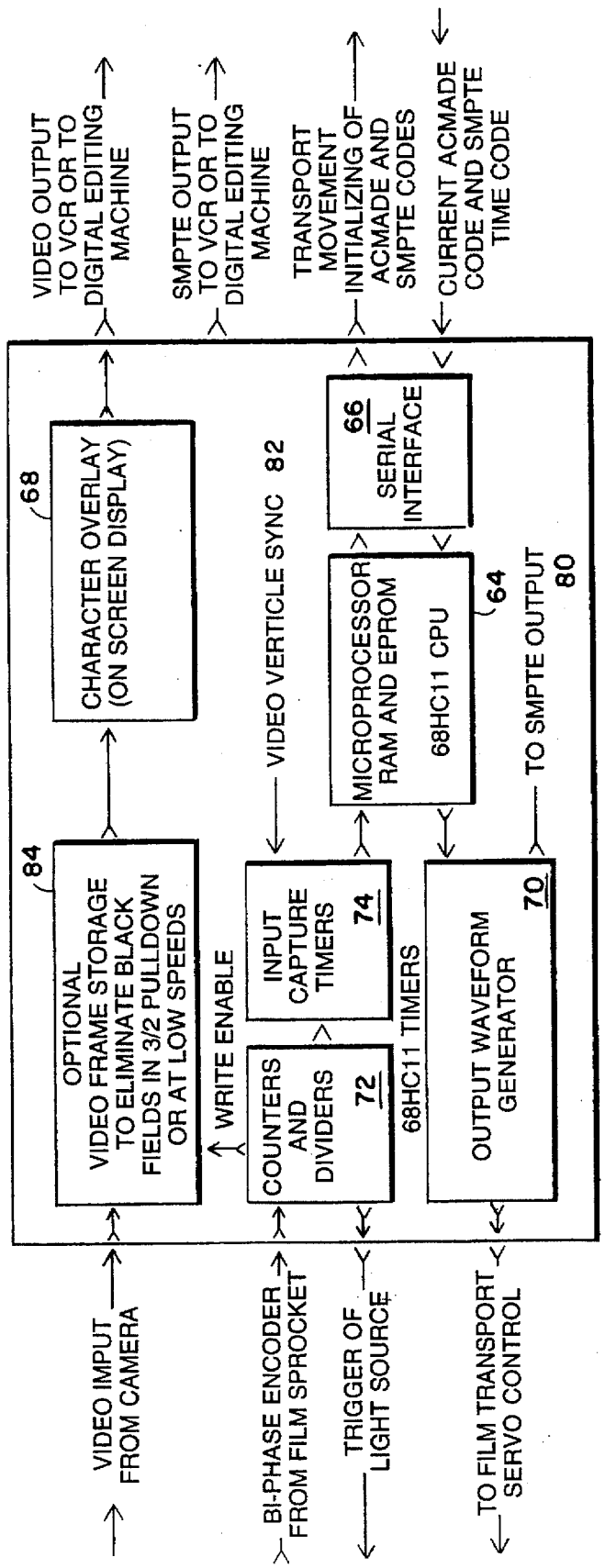
FIG. 5 is an internal schematic diagram showing discrete portions of the signal processing transceiver/control circuit of the invention.

At the heart of the control circuit 60 (FIGS. 5 and 8) is a programmed microprocessor 64, preferably a Motorola 68HC11 or the like. To provide the microprocessor 64 with sufficient operating room, a sufficient amount of random access memory (RAM) on the order of 8K or more is provided so that the required logical operations can take place and the data generated by those and other operations can be buffered and/or stored.

Furthermore, in order to synchronize and activate coordinated operation of the several elements of the present invention, timers, pulse-generators, and pulse receivers are used for signal processing means. Interfaces 66 are present that provide means by which signals can be transferred into and out of the control circuit, such interfaces known to those familiar with the art and including serial and RS-232 interfaces. One element present in the control circuit is a video character overlay generator 68 that generates its own video signals representative of time codes and/or other information. The video character overlay generator 68 received formatted media codes from the microprocessor 64 so that updates may be made to the video character overlay generator.

In order to operate and control the control circuit 60 of the present invention, a commercially available laptop computer 62 running special interface software may be used to provide easy access and control to the features, functions, and operations of the present invention. This special software operates as set forth in more detail below. Without undue experimentation, it is believed that the person of ordinary skill in the art will realize the structure and coding sequences necessary to realize such software. The laptop 62 signals of the control circuit 60 with a variety of known signals and/or known signal protocols so that a variety of commands can be passed from the personal computer 62 to the control circuit 60 in order to implement the instructions of the operator, generally an editing assistant.

While implementing a mnemonic visual user interface as is common in a plurality of current software programs, the editing assistant can indicate his or her desire to move the film on the flatbed editing table 12 forward, reverse, to stop, or in high speed, as well as a stand-by mode where the film frame 26 can be centered upon the strobe bulb 22. One means by which this can be accomplished is by a series of user prompts present on the screen indicating that a key on the laptop keyboard will initiate the sequence necessary to accomplish a certain task, such as moving the flatbed editing machine forward so that the film can be reviewed and/or positioned.

Furthermore, the laptop 62 receives the initial and terminal film reel frame code information (generally, Acmade) so that the control circuit 60 can generate, use and maintain the current code information appropriate for the current film reel and its frames as well as SMPTE time code information for the video signal 38. Generally, log information such as the scene number, the shot number, a description of the scene, and related pertinent information can be associated with the film frame code information in the personal computer 62.

The logging of such information establishes a database for a telecine log file that when appropriately formatted for the digital editing machine 40 can be associated with the video signal sequences 38 that correspond to the log information. That is, by recording the log information and transferring it as by floppy disk to the digital editing machine 40, the log information can be conveniently associated with the video signal sequences 38 processed by the control circuit 60 and received by the digital editing machine 40 and/or the video tape 41.

The log information is conveniently recorded by the laptop computer 62. In movie making, ten different "takes" of the exact same scene will sometimes be made in order to achieve the artistic effect desired by the director. With the log information, it becomes much easier (and therefore much more advantageous) to keep track of exactly what is going on with respect to the different video signal sequences 38 recorded from the film reel or reels. Known data structures and software operating techniques can be used to achieve the user interface implemented by the laptop or other personal computer.

In order to ensure the proper coordination of the film with the resulting video images 38, it is important to provide a feedback loop so that the film frames 26 are always centered before the strobe light 22 or otherwise positioned in a way to lock to the video camera for the video signal pulldown. When the film frames 26 are consistently centered before the strobe light 22, the video camera 24 consistently sees the same area lit up by the strobe light and the image captured by the frame of motion picture film.

The flatbed editing table 12 is remotely controlled by means of pulses that indicate to a servo motor within the flatbed editing table the direction and distance the film is to be moved. Often, these pulses are taken from the AC power supply as it oscillates at fifty or sixty hertz. However, other pulses, including those generated by the control circuit 60, may be used so long as they are recognized by the flatbed editing table By controlling the pulses sent as input to the flatbed editing table, the operation of the flatbed editing table may be precisely controlled. In order to control the film transport, the control circuit 60 is operatively connected to the flatbed editing table's remote control circuit.

Generally, an output waveform generator 70 within the control circuit 60 is used to drive the flatbed editing table 12 via its remote control. The output waveform generator 70 takes as its input, signals from microprocessor 64. In response to that input, the output waveform generator 70 transmits signals according to the microprocessor's input. The output waveform generator 70 transmits pulses or waveforms sufficient to drive the flatbed editing table 12. In order to control the film transport, the output waveform generator 70 may phase shift its output waves or otherwise alter its transmission in order to control the flatbed editing table 12.

In response to the output waveform generator's signals, the flatbed editing table 12 transports the film 16. As the film is transported from the supply reel to the take-up reel on the flatbed editing table, it engages and turns the sprocket 18 with its bi-phase encoder 20. The encoder 20 transmits pulses to the control circuit 60 where they are used to determine and monitor the progress of the film 16 across the flatbed editing table As a result of the encoder pulses, the strobe 22 is triggered, which in turn activates the video camera 24. The video camera 24 transmits to the control circuit 60 vertical sync signals that indicate when the video camera 24 has transmitted one complete video field 32a of the two fields required for a complete video frame 30.

Upon receiving a sync pulse at the end of a video frame 30, the control circuit 60 compares the sync pulse times with the encoder pulse times to ensure that the two occur in an appropriately synchronous manner. If there is a discrepancy or error present between the video sync and encoder times, the control circuit 60 signals the output waveform generator 70 to alter its output waveform to the flatbed editing table 12 in order to compensate for the error or discrepancy. Sometimes this entails speeding the film transport table 12 up, and sometimes it means slowing the film transport table down.

Generally, any accommodation made by the control circuit 60 for sync/encoder errors is minor in nature and timing errors usually require only slight compensations. As this phase-locked loop is monitored on a film frame by film frame basis, a high degree of correspondence between the film and the resultant video signal is consistently maintained by making only minor adjustments during the film transport process.

The bi-phase encoder 20 transmits 500 pulses for every frame 26 of motion picture film. These 500 encoder pulses translate into 125 quadrature cycles. The encoder pulses are transmitted to one of several dividers 72 inside the control circuit 60 which divides the number of pulses by twenty-five (25) to give a resulting signal having twenty (20) pulses per film frame. Four-fifths of these pulses, or sixteen pulses, correspond to a single video frame with two, eight pulse video fields. These 20 pulses per film frame are transmitted to one of several input timers 74 that times and counts the pulses coming from the encoder divider 72. The pulse times and counts are stored in memory registers or the like for access by the microprocessor 64 and/or program steps implemented by the microprocessor.

The input timer 74 may pass the incoming 20 pulses per motion picture film frame onto a second divider 72 which divides the 20 pulses per film frame by 20 in order to yield a signal having one pulse per film frame. This one pulse per film frame signal acts as the strobe trigger and activates the strobe light 22 every 500 encoder pulses.

With respect to the coordinated operation of the video camera 24 and its video signals 38 with the motion picture film 16, when the strobe light 22 flashes and transmits the image captured on the frame 26 of motion picture film 16 to the video camera 24, the video camera 24 receives the image and transmits the video frame 30 to the next two available video fields as shown in FIG. 6. At the end of each video field 32a, the control circuit 60 derives a sync pulse from the incoming video signal indicating the end of a video field and the beginning of the next video field. The microprocessor 64 is interrupted by this video sync signal. When so interrupted, the microprocessor 64 determines the time of the video sync pulse from its microprocessor clock and compares that time to the time stored in the registers by the encoder input timer 74. As set forth above, any discrepancy present between the video sync time and the encoder time is used to determine what alterations should be made to the output waveform generator 70 output to the flatbed editing table 12 and subsequently the flatbed editing table 12 operation.

As the motion picture film image and the resulting video signal are tied or coordinated together by the strobe 22, the encoder 20, the control circuit 60, and the flatbed editing table 12, it is possible to maintain a high degree of consistency between the locations of individual film images presented to the video camera 24 by the strobe 22.

Having described the means by which a film frame image is captured by a video camera and translated into a video signal, description is made further below with respect to the enhancement and processing of that signal. As the video signal is entirely in electronic form, only the following machine implemented process means or similar devices implementing similar means, are contemplated as providing the proper handling of the captured video signal so that its correspondence to its film frame image can be indicated by media codes.

Figure 4:
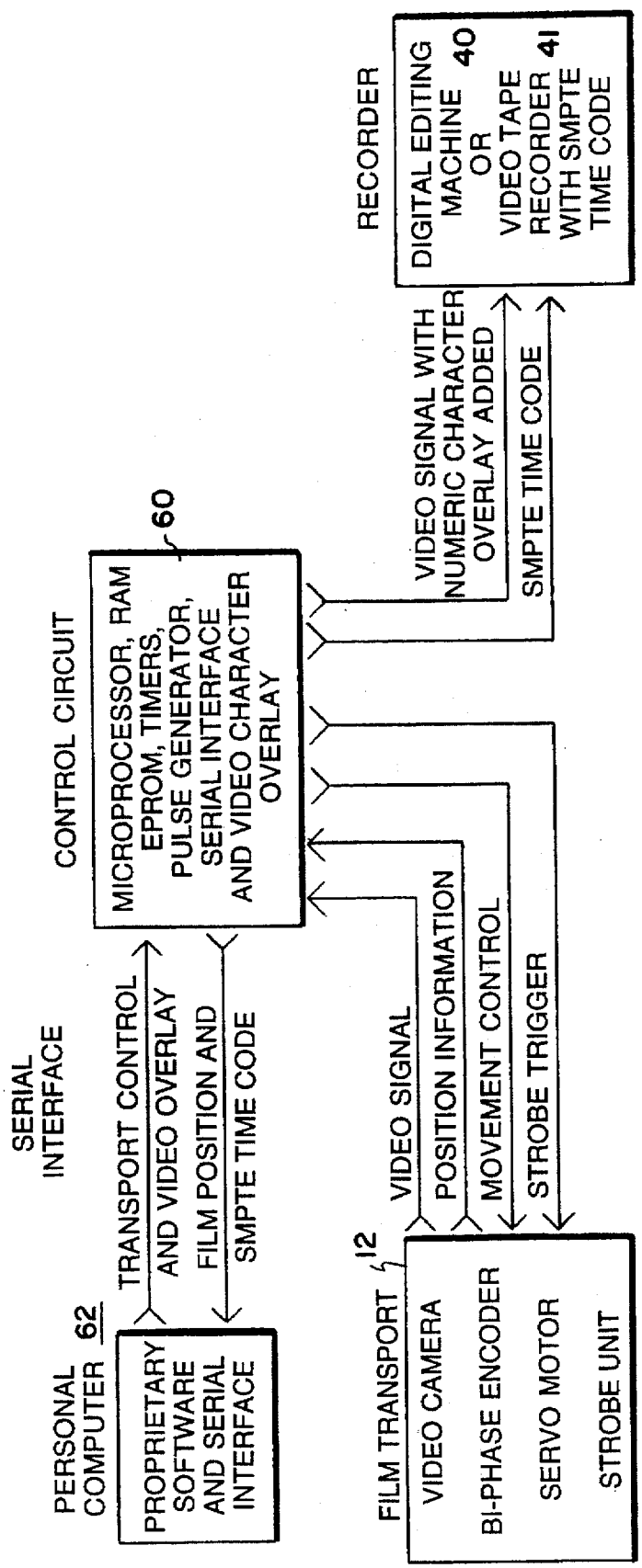
FIG. 4 is a signal schematic diagram generally showing the individual portions of the present invention transmitting and receiving signals.

As shown in FIG. 4, a schematic of the control circuit 60 is shown having several components and incoming and outgoing signals. At the heart of the control circuit 60 is the microprocessor 64 with its RAM and EPROM programming. Programmed preferably in assembly language, the microprocessor 64 may be a presently commercially-available Motorola 68HC11 CPU, or the like.

The microprocessor 64 is connected to a serial interface 66 through which signals can be transferred to and from a personal computer 62 associated with the control circuit 60. Such signals include transmissions of current Acmade code and SMPTE time code to the personal computer 62 and transmission from the personal computer 62 of transport movement codes and signals, as well as the initial Acmade and SMPTE codes.

The microprocessor 64 has or is input coupled to a number of input capture timers 74 which are generally available in association with the 68HC11 microprocessor 64. The microprocessor 64 is output coupled to the output waveform generator 70 which in turn controls the film transport servo control and also provides a SMPTE time code output 80. By altering its output to the output waveform generator 70, the microprocessor 64 can control the operation of the output waveform generator 70. Separately, the microprocessor 64 can also control the value of the SMPTE time code output.

The SMPTE output 80 generated by the output waveform generator 70 can be transmitted to a VCR 41 in association with the video signals 38 generated by the video camera 24 or can be associated with the video signal 38 and transmitted either along with or separately from the video signal 38 when transmitted directly to a digital editing machine 40. As there are thirty (30) video frames per second, in order to generate a Manchester code for each such video frames, a clock rate of four thousand eight hundred (4,800) Hertz is needed to accommodate the as many as one hundred sixty (160) possible Manchester code transitions for each video frame. In response to input signals received from the microprocessor 64, the output waveform generator 70 generates and transmits the Manchester code corresponding to the current SMPTE value. The Manchester code is then associated with its corresponding video frame in the video signal 38.

The input capture timers 74 can take input from the counters and dividers 72 present within the control circuit 60 as well as the video vertical sync output 82 of the video camera.

The counters and dividers 72 are input coupled to the bi-phase encoder 20 of the film sprocket 18 and are output coupled to the strobe light 22 so as to trigger the strobe 22 when a frame 26 of motion picture film 16 is centered before it. The counters and dividers 72 may also be output coupled to an optional video frame storage circuit 84 that eliminates black fields that are generated during the telecine process of the present invention that occur during 3/2 pulldown or at low film transport speeds.

The video frame storage circuit 84 is input coupled to the video input 38 from the video camera 24 and is input coupled to the counters and dividers 72. The video frame storage circuit 84 is output coupled to the on-screen character overlay display 68. The on-screen character overlay display 68 is output coupled to a VCR 41 or a digital editing machine 40 and the video output from the on-screen character overlay display 68 is associated with the SMPTE output 80 from the output waveform generator 70.

In an alternative embodiment, electronic video signal matting and unsqueezing circuitry may be used to adjust the video signals 38 so that wide screen film formats may be accommodated by telecine system of the present invention. Such circuitry can be connected serially almost anywhere along the video signal path.

OPERATION

Having described the separate mechanical and electronic elements of the present invention, description is now made of the operation of the previously described elements in a coordinated fashion to generate the temporally corresponding, frame accurate video signal from the individual film frames of the film reel.

As set forth above, the video camera 24, flatbed editing table 12 and strobe light 22 are feedback looped to produce consistent placement of the frames 26 of motion picture film 16 before the strobe 22. When the strobe 22 flashes, the resulting video signals transmitted as output 38 by the video camera 24 require an associated SMPTE time code that, when later transferred to the digital editing machine, links the Acmade code of the individual film frames 26 to the SMPTE time code of their resultant video signal images 82 (FIG. 6) as transferred to the digital editing machine 40.

The control circuit 60 takes the video signal output 38 from the video camera 24 (FIG. 6) and overlays the video signal images 38 with the numerical Acmade and SMPTE codes for display by means of the onscreen character overlay display 68. The control circuit 60 also associates an eighty bit Manchester code according to ANSI/SMPTE 12M-1986 standard or the like with the video signal 38. By attaching the media codes to the video signals 38 in these two manners, persons viewing the video signals can determine the frames 26 of motion picture film 16 from which the video signals 38 arose. Furthermore, electronic editing or other video signal machines can read the eighty bit Manchester code and determine the SMPTE time code for the video frames 30. While an audio track associated with the video image signal can be used to record the Manchester code, it is more common for the Manchester code to be recorded on what is known as the address track.

Initially, a point certain on the reel of film is designated with the Acmade code of that point. All other Acmade codes for the other frames of film on the reel may be calculated from the set point. Also, SMPTE time code may also be determined due to the specific relationship between the speed of the film frames and the rate of video signal transmission when the film 16 is running at "sound speed".

The Acmade code of a first frame or "head" of motion picture film (and optionally a beginning SMPTE code for the resulting video image of that first frame) may be entered via keyboard input of the personal computer 62 linked to the control circuit 60. Additionally, as well as the "head" indicating the first film frame, a "tail" Acmade code can also be entered into the personal computer 62 and transmitted to the control circuit 60. Alternatively, either of or both the beginning and ending frames of motion picture film segment to be converted by telecine can be indicated during the telecine process, "on the fly".

During the telecine process, the Acmade and SMPTE codes of the film and video signals, respectively, are calculated by the control circuit 60. Once the flatbed editing table 12 reaches the "tail," the telecine process may be complete. The ending Acmade code is recognized with the corresponding SMPTE time code recorded by the personal computer 62 so that it becomes part of the resulting telecine log file generated, kept, and maintained by the personal computer 62 for later transmission to the digital editing machine 40.

However, subsequent film sequences on the same reel can then be made subject to the present telecine process. For example, with the "dailies" reels generated during commercial film production, the entire one thousand foot reel is usually telecined in one sitting. While the film is running and the telecine operation is taking place, the operator indicates the "head" and "tail" film frames by pressing the appropriate key on the laptop computer 62, which then stores the SMPTE time code for the Acmade code of the film frame.

Generally, the operator notices the presence of the person holding the slate coming into camera view. As the clap of the hinged portion will be soon forthcoming, the operator would generally capture the current SMPTE code for the present frame (the "head" frame) by pressing the appropriate key. When the "take" is finished, the operator presses the appropriate key to indicate the "tail" with the computer 62 capturing the SMPTE code corresponding to the "tail" for entry into the telecine log file. During the time that the "take" is telecined, the operator may enter into the computer 62 pertinent identifying text that describes the "take" for future reference, as well as any other comments or notes of future interest. This identifying text is incorporated into the telecine log file and later transferred to the digital editing machine.

Should a program log be available for a daily reel, the "head" and "tail" frame Acmade code numbers, along with descriptive information, can be entered into the computer 62. The telecine process for such a reel can be almost entirely automatic as the computer 62 can monitor the film transport and Acmade code incrementation by the control circuit 60. With the arrival of each pertinent Acmade code, the computer 62 can save the associated SMPTE codes in the telecine log file with the associated descriptive information.

Each "take" on the reel is telecined in a like manner. The initialization and telecine process are subsequently repeated for any additional reels of film present in the "dailies" As the "dailies" are chosen in advance by the director for printing, generally the entirety of the daily reels are telecined.

Usually, each reel of film has an identifying hole at its start that acts as a set point for the reel's Acmade code. After frame-centering has occurred, the hole is set centered before the strobe and the hole's Acmade code is keyed into the computer 62 by the operator which is subsequently transmitted to the control circuit 60.

All subsequent Acmade and SMPTE codes for the reel of film may the be calculated by the control circuit 60 for the reel of film. As digital editing machines generally calculate their own Acmade codes from an initial Acmade value with SMPTE code offsets, capture of the ensuing SMPTE codes by the computer 62 into the telecine log file serves to provide sufficient information regarding that which is to be digitized and edited by the digital editing machine 40.

The telecine process described herein is one that is optimally conducted when the motion picture film 16 is travelling at "sound speed," i.e., 24 film frames per second. In order to ensure that the motion picture film 16 is travelling at speed, it is common to pre-roll the film back 9 feet from the preferred starting film frame. As the 24 film frames per second translates into 1½ feet, when 16 frames are present per foot of film, the 9 foot pre-roll gives 6 seconds of pre-roll time so that the flatbed editing table can bring the film up to speed.

The calculation of the Acmade and SMPTE codes occurs within the control circuit 60 as follows. Once a specific film frame has been designated with a certain Acmade code, all other film frames on the reel can be determined by the number of bi-phase encoder pulses that have occurred since the designation of the specific film frame. When the initial film frame is indicated by input from the personal computer, signals received by the control circuit 60 from the flatbed editing table 12 indicate to the control circuit 60 that the film 16 is being turned backwards, probably by remote control at the personal computer 62, but possibly by hand.

As the film 16 travels past the strobe 22, the computer 62 waits for the pre-roll segment to pass by before recognizing the initial "head" film frame in order to log the starting frame into the telecine log file. The control circuit 60 compares series of incoming encoder pulses to determine if the film 16 is up to speed. Once the film 16 is up to speed, the telecine process begins.

At the "head" film frame, the strobe light 22 pulses and the video camera 24 soon thereafter sends the two sync pulses indicating the creation of a video signal frame 30 from the flash of the strobe light 22. With the continued passing of the film 16 past the strobe light 22, subsequent strobe trigger pulses (as previously described as arising from the divided output of the encoder input timer 74), indicate the passage of individual film frames 26 of the film 16 past the strobe light 22. With each additional strobe trigger pulse after the "head" film frame, the memory register holding the original Acmade code, or a copy of it, is incremented so that the current film frame before the strobe light 22 can be determined by accessing the register and reading the number of the incremented Acmade code.

Similarly for the updating of the SMPTE time code values, with every sixteen pulses from the encoder divider 72, a new video frame 30 is indicated. Preferably, a copy of the initial SMPTE code value is made into a memory register and incremented according to the incoming number of encoder divider 72 pulses.

Any displays indicating the current values of these codes are updated to reflect the latest Acmade and SMPTE values, as are pertinent memory registers and screen displays present in the personal computer 62.

The on-screen character overlay display 68 is updated so that the appropriate Acmade and SMPTE codes can be "burned in" to the video signal 38 so that each video frame is "branded" with its own Acmade and SMPTE codes. Furthermore, the appropriate eighty bit Manchester code is also transmitted by the output waveform generator 70 so that it may be associated or attached to the video signal 38 before it leaves the control circuit 60.

This process is repeated for each film frame 26 captured by strobe flash by the video camera 24 until the "tail" film frame comes before the strobe light 22 and is captured by the video camera 24. Upon updating the incremented Acmade and SMPTE code memory registers, the "tail" Acmade value is recognized by the computer 62 as the ending point of the current film segment. The SMPTE code of the "tail" film frame is logged in the telecine log file by the computer 62. Film transport may then be stopped or subsequent telecine operations may be performed.

Upon the compilation of such a series of telecine episodes, the telecine log file, having one or more entries and corresponding to the resulting video signals, may be copied onto floppy disk. Along with a resulting video tape recording, the telecine log file may be transferred to a digital editing machine 40 where the information stored on the disk and the tape are downloaded to the digital editing machine. Alternatively, it is contemplated that future digital editing machines will allow the video signal 38 to be transferred directly to the digital editing machine. The telecine log file on the floppy would then be transferred over to the digital editing machine for use by the digital editing machine.

One of the great advantages of the telecine system 10 of the present invention is its ease of use. Upon placing the film reels on the flatbed editing machine 12 and threading the film through the film gate 14, the center of the film frame 26 is found so that it may be placed directly between the strobe 22 and the mirror 28 (for subsequent transmission to the video camera 24). Having threaded the film 16 through the film gate 14, a light source such as the strobe 22 or other source may be used to continuously illuminate the film 16 to optically transmit the film frame image to the video camera 24. A video monitor (not shown) coupled to the video camera 24 can be used to inspect and determine the image so transmitted to the video camera 24.

When the film frame image is shown upon the monitor so that the film frame is centered in the film gate 14, the image generated by the video camera 24 and as shown upon the monitor will be centered, in focus, and in good resolution. The telecine process is now ready to be undertaken once a light-tight enclosure (not shown) is superposed to the flatbed editing table 12.

Once a known start frame has been determined and keyed into the computer 62, the film 16 may be pre-rolled for telecine. The editing assistant or other operator engages the telecine process by so indicating through the laptop computer 62, as by pressing a key that corresponds to the forward telecine process. A command signal generated by the laptop computer 62 is transmitted to the control circuit 60 which recognizes the command signal as one being the forward telecine process indicator. A signal is generated by the control circuit 60 and transmitted to the motor of the flatbed editing table 12 via the output waveform generator 70. In response, the flatbed editing table 12 transports the film forward across the film gate 14.

The drive motor (not shown) of the flatbed editing table 12 begins to pull the film 16 off the supply reel and onto the take-up reel, past the film sprocket 18 with its bi-phase encoder 20. The film is soon brought to "sound speed" and the telecine process begins. When the "head" film frame passes the strobe 22, or is otherwise designated, its passing is noted by the computer 62 which logs the SMPTE time code of the "head" into the telecine log file.

As the film travels from the supply to the take-up reel, the bi-phase encoder 20 sends its pulses to the control circuit 60 which keeps count of the number of signals received by the bi-phase encoder 20. When the appropriate number, e.g. 500, have been received by the control circuit 60, the control circuit sends an activation signal to the strobe 22 as one complete film frame 26 has passed by the bi-phase encoder 20 and therefore the film gate 14 as well.

Upon receiving the activation signal from the control circuit 60, the strobe 22 flashes brightly to optically transmit the image stored upon the film frame 26 to the mirror 28 and the video camera 24. The video camera 24 receives the image from the film and stores it in the next two available video fields as previously explained. These two video fields are transmitted to the control circuit 60 as are the next two sequential video fields corresponding to the next film frame (as the process is repeated a second time). As previously described, blank video fields 36, 46 become part of the video signal after each second frame.

Before transmitting the five video fields to either a digital editing machine 40 or a video tape recorder 41, the control circuit 60 overlays the appropriate media codes upon the video fields, the overlaid media codes corresponding to the film frames from which the corresponding video fields arose. In this way, correspondence, registration, and/or frame accuracy is maintained between the original film 16 with its images and the video signals 82 resulting when the telecined video signals 38 are pulled down by the digital editing machine 41. Manchester code 80 is also generated and associated with the video signal 38.

After the video signals have been digitally edited by the digital editing machine, the digital editing machine can use the imported telecine log list to calculate the edit decision list. Alternatively, the time codes overlaid upon and associated with the video fields can be used to accurately determine exactly where the editing cuts should be made in the film 16 so as to indicate the final edited film work.

The video signals 38 generated by the present invention are in a format that is recognized and easily received by known digital editing machines 40, such as the LIGHTWORKS and AVID systems, and the operation of these machines as well as their handling and manipulation of incoming video signals are well known to those of ordinary skill in the art.

While the present invention has been described with regards to particular embodiments, it will be recognized by those of ordinary skill in the art that additional variations of the present invention may be devised without departing from the inventive concept as claimed herein.

A portable telecine system was constructed in accordance with the foregoing teachings and found to decrease and simplify the telecine process, allowing the telecine process to be performed on-site with greater speed and efficiency and at a greatly reduced cost than currently existing devices used at pre-existing, fixed, video post-production facilities.

What I claim is:

1. A telecine system for converting motion picture film having a consecutive series of frames to consecutive video image signals that temporally correspond exactly to the motion picture film with each film frame corresponding to a unique video frame, comprising:

film transport means for transporting said film from a supply reel to a take up reel at a film rate having a first number of film frames per second reflecting a temporal sequence captured by said film, said film transport transmitting film transport signals indicating transport of said film, said film transport means being remotely operable;

a video camera, said video camera coupled to said film transport means in proximity to said film, said video camera creating a video signal stream having video image signals at a video image signal rate having a second number of video frames per second, said video camera selectively transmitting video sync signals for selected video fields;

an intermittent illumination source adjacent said film and projecting individual frames of said film to said video camera at said film rate, said illumination source remotely triggerable; and a control circuit, said control circuit coupled to said film transport means, said video camera, and said illumination source, said control circuit remotely operating said film transport means and remotely triggering said illumination source in response to said film transport signals, said control circuit receiving said film transport signals and said video sync signals and responsive thereto adjusting said film rate to maintain a predetermined relationship between said film rate and said video image signal rate; whereby said video signal stream temporally corresponds exactly to the motion picture film travelling at said film rate with each frame of the motion picture film temporally corresponding exactly to a frame of said video signal stream.

2. The telecine system of claim 1, wherein said film rate is less than said video image signal rate and said video camera creates black video fields in said video image signal to accommodate said slower film rate.

3. The telecine system of claim 1, wherein said film transport means further comprises encoder means for detecting movement of said film, said encoder means engaging said film and transmitting said film transport signals upon detecting movement of said film.

4. The telecine system of claim 3, wherein said encoder means comprises a film sprocket coupled to a bi-phase encoder, teeth of said sprocket engaging said film, said bi-phase encoder transmitting said film transport signals.

5. The telecine system of claim 1, wherein said video camera creates video image signals in discrete video field portions without corrupting a previous video field.

6. The telecine system of claim 5, wherein said video camera is a CCD video camera.

7. The telecine system of claim 1, wherein said intermittent illumination source comprises a strobe light.

8. The telecine system of claim 1, wherein said control circuit determines a first time of receiving a video sync signal, determines a second time of projection of an individual film frame to said video camera, compares said first time with said second time, and if a discrepancy is present between said first time and said second time, said control circuit modifies said film rate of said film transport means.

9. The telecine system of claim 1, wherein said temporally corresponding video image signal has images recorded corresponding to images present on said film in a ratio of said first number of film frames per second to said second number of video frames per second and said video image signal has blank video fields in a ratio of said second number minus said first number to said second number.

10. The telecine system of claim 1, wherein said telecine system further comprises media code means for generating and associating media codes with said video image signals, said media code means associated with said control circuit.

11. The telecine system of claim 10, wherein said media code means comprises Manchester code generation means.

12. The telecine system of claim 11, wherein said media code means further comprises an on screen character overlay display.

13. The telecine system of claim 10, wherein said media code means comprises Acmade code and SMPTE time code calculation and storage means for calculating and storing such codes.

14. The telecine system of claim 10, wherein said media code means receives said film transport signals and updates media codes according to said film transport signals.

15. The telecine system of claim 10, wherein said telecine system further comprises a user interface, said user interface coupled to said control circuit and receiving input and commands from an operator, thereby allowing said operator to control the telecine system, and receiving media codes from said media code means, thereby allowing said operator to monitor a telecine process performed by the telecine system.

16. The telecine system of claim 15, wherein said user interface comprises a computer, said computer storing media codes of said media code means in a telecine log file when so directed by said operator, said media codes indicating beginning and ending video frames of video image signals respectively corresponding to beginning and ending film frames.

17. A telecine system for converting motion picture film having a consecutive series of frames to consecutive video image signals that temporally correspond exactly to the motion picture film with each film frame corresponding to a unique video frame, comprising:

film transport means for transporting said film from a supply reel to a take up reel at a film rate having a first number of film frames per second reflecting a temporal sequence captured by said film, said film transport means comprising a film sprocket coupled to a hi-phase encoder, teeth of said film sprocket engaging said film, said hi-phase encoder detecting movement of said film and transmitting film transport signals upon detecting movement of said film indicating transport of said film, said film transport means being remotely operable;

a video camera, said video camera coupled to said film transport means in proximity to said film, said video camera creating a video signal stream having video image signals at a video image signal rate having a second number of video frames per second, said video camera comprising a CCD video camera creating video image signals in discrete video field portions without corrupting a previous video field, said video camera transmitting video sync signals for at least each video field for each video frame;

said film rate being less than said video image signal rate and said video camera creating black video fields in said video image signal to accommodate said slower film rate;

an intermittent illumination source comprising a strobe light adjacent said film and projecting individual frames of said film to said video camera at said film rate, said illumination source remotely triggerable;

a control circuit, said control circuit coupled to said film transport means, said video camera, and said illumination source, said control circuit remotely operating said film transport means and remotely triggering said illumination source in response to said film transport signals, said control circuit performing a phase-locked loop function to maintain said film rate in a predetermined relationship with respect to said video image signal rate responsive to said film transport signals from said bi-phase encoder and said video sync signals from said video camera;

media code means for generating and associating media codes with said video image signals, said media code means associated with said control circuit said media code means comprising Manchester code generation means, an on screen character overlay display, Acmade code and SMPTE time code calculation and storage means for calculating and storing such codes, said media code means receiving said film transport signals and updating media codes according to said film transport signals; and a computer coupled to said control circuit and receiving input and commands from an operator, thereby allowing said operator to control the telecine system, and receiving media codes from said media code means, thereby allowing said operator to monitor a telecine process performed by the telecine system, said computer storing media codes of said media code means in a telecine log file when so directed by said operator, said media codes indicating beginning and ending video frames of video image signals respectively corresponding to beginning and ending film frames; whereby said video signal stream temporally corresponds exactly to the motion picture film travelling at said film rate with each frame of the motion picture film corresponding exactly to a frame of said video signal stream, said exactly temporally corresponding video signal stream having consecutive images recorded in exact temporal correspondence to images present on said film in a ratio of said first number of film frames per second to said second number of video frames per second and said video image signal has blank video fields in a ratio of said second number minus said first number to said second number.

18. In a motion picture film editing device, the combination of a film sprocket drive which is indexed to follow a film passage, wherein intermittent light is projected through said motion picture film and the projected image is recorded in exact temporal correspondence on a video tape by means of a video camera via a 2-2-1 pulldown, and the images are thereafter electronically stored with video codes associated with said images exactly corresponding to film codes associated with said film and electronically manipulated whereby editing of the stored material can be accomplished, said exact temporal correspondence being maintained by a control system for controlling a rate of said film passage responsive to a predetermined differential between a measured fill passage rate and a synchronization signal from said video camera.

19. In a motion picture film editing device, the combination of:

means to index and encode motion picture film and carry it through a path to be exposed to an intermittent light source;

means to record the projected images in expanded fashion from the original motion picture film onto video tape so that the stream of videotape recorded images temporally correspond exactly to the original motion picture film and the film's recorded images;

means to control a rate at which said motion picture film is exposed to said intermittent light source responsive to a predetermined differential between a measured film exposure rate and a synchronization signal from said record means;

means to electronically digitize the projected images and store them in a form whereby they may be manipulated and edited; and means to reconstitute in edited fashion the stored images, whereby editing of motion picture film may be accomplished.

20. A telecine control apparatus for accurately generating an exact resulting temporally corresponding video image signal stream with associated video image signal code from an original motion picture film with associated film code, the apparatus comprising:

film motion signal detection means for detecting film motion signals generated when said motion picture film is transported from a supply reel to a take-up reel, said film motion signal detection means emitting signals in response thereto;

intermittent illumination trigger means for triggering an intermittent illumination device adjacent said film, said trigger means coupled to said film motion signal detection means, said trigger means periodically triggering said illumination device in response to said signals of said film motion signal detection means when said film motion signal detection means detects complete passage of a single frame of said film past said illumination device;

video image signal stream reception means for receiving a video image signal stream from a video camera receiving film images via said illumination device, said video image signal stream temporally corresponding in an exact and consistent manner to said film, said video image signal representing images generated when said illumination device is triggered;

video sync signal detection means for detecting a video sync signal emitted by said video camera when said video camera transmits a discrete video frame portion of said video image signal corresponding to a single frame of said film, said video sync signal detection means emitting signals in response thereto;

film transport control means for controlling a film transporter that transports a reel of said film from said supply reel to said take-up reel, said film transport control means coupled to said film motion signal detection means and said video sync signal detection means, said film transport control means including comparison means for comparing relative timing of said signals of said motion detection means and said signals of said video sync signal detection means, said film transport control means controlling speed of transport of said film from said supply reel to said take-up reel thereby providing a film transport feedback loop coordinated by video sync signals and ensuring consistent and exact temporal correspondence of said video image signal with said film as film speed is matched to video camera speeds;

media code generation means for generating, updating and maintaining codes for uniquely indicating individual film frames of said film and individual video frames of said exactly temporally corresponding video image signal stream, said media code generation means responsive to signals from said film motion signal detection means, said codes including at least SMPTE time code exactly temporally corresponding in a consistent manner to said film;

video image signal image character overlay means for generating video image signal character images and combining said character images with said exactly temporally corresponding video image signal stream, said overlay means coupled to said media code generation means and generating video image signals corresponding to codes stored by said media code generation means;

video image signal stream output means for transmitting said exactly temporally corresponding video image signal stream overlaid with said character images in association with said SMPTE time code; and media code log means for preserving certain media codes in a recognized format in a telecine log file, said certain media codes corresponding at least to beginning and ending video frames of said motion picture film and beginning and ending video frames of said video image signal stream exactly corresponding to said beginning and ending film frames; whereby a resulting video image signal may be created with overlaid as well as associated SMPTE code, all temporally corresponding in an exact manner with the original motion picture film, each film frame of the original motion picture film uniquely corresponding to a video frame of said resulting video image signal, and a telecine log file corresponding to said resulting video image signal and the original motion picture film may be provided, said resulting video image signal and said telecine log file ready for use by a digital video editing machine.

* * * * *

UNITED STATES PATENT AND TRADEMARK OFFICE
CERTIFICATE OF CORRECTION

PATENT NO. : 5,671,008
DATED : September 23, 1997
INVENTOR(S) : LINN, Stephen Scott It is certified that error appears in the above-identified patent and that said Letters Patent is hereby corrected as shown below:

Column 5, Line 3 delete "if", insert -- is --.
Column 7, Line 27 delete "indicated",
 insert -- indicate --.
Column 9, Line 61 after "invention", delete -- is --.
Column 15, Line 42, after "film", insert -- 16 --.
Column 15, Line 58, after "table", insert -- 12. --.
Column 16, Line 15, after "table", insert -- 12. --.
Column 19, Line 63, after "dailies", insert punctuation mark -- . --.
Column 20, Line 6 after "may", delete -- the --.
Column 24, Line 39, "hi-phase" should be bi-phase --.
Column 24, Line 41, "hi-phase" should be -- bi-phase --.
Column 25, Line 56, "fill" should be -- film --

Signed and Sealed this

Seventeenth Day of February, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,671,008
DATED : Sept. 23, 1997
INVENTOR(S) : Stephen Scott Linn

It is certified that error appears in the above-identified patent and that said Letters Patent is hereby corrected as shown below:

On title page  insert --item [73] Assignee:  MaestroWorks, Inc.,
                                             Los Angeles, Calif. --.

Signed and Sealed this

Fourteenth Day of April, 1998

Attest:

BRUCE LEHMAN

*Attesting Officer*          *Commissioner of Patents and Trademarks*